Feb. 19, 1963 L. H. TAYLOR 3,077,800
APPARATUS AND METHOD FOR DETECTING AND
COMPENSATING FOR ROLL DEFLECTION
ON A ROLLING MILL
Filed May 9, 1958 10 Sheets-Sheet 1

INVENTOR.
Louis H. Taylor
BY Webb, Mackey + Burden
HIS ATTORNEYS

INVENTOR.
Louis H. Taylor
BY Webb, Mackey & Burden
HIS ATTORNEYS

Feb. 19, 1963

L. H. TAYLOR 3,077,800

APPARATUS AND METHOD FOR DETECTING AND
COMPENSATING FOR ROLL DEFLECTION
ON A ROLLING MILL

Filed May 9, 1958

INVENTOR.
Louis H. Taylor
BY Webb, Mackey & Burden
HIS ATTORNEYS

INVENTOR.
Louis H. Taylor

Feb. 19, 1963

L. H. TAYLOR 3,077,800

APPARATUS AND METHOD FOR DETECTING AND
COMPENSATING FOR ROLL DEFLECTION
ON A ROLLING MILL

Filed May 9, 1958

INVENTOR.
Louis H. Taylor
BY Webb, Mackey & Burden
HIS ATTORNEYS

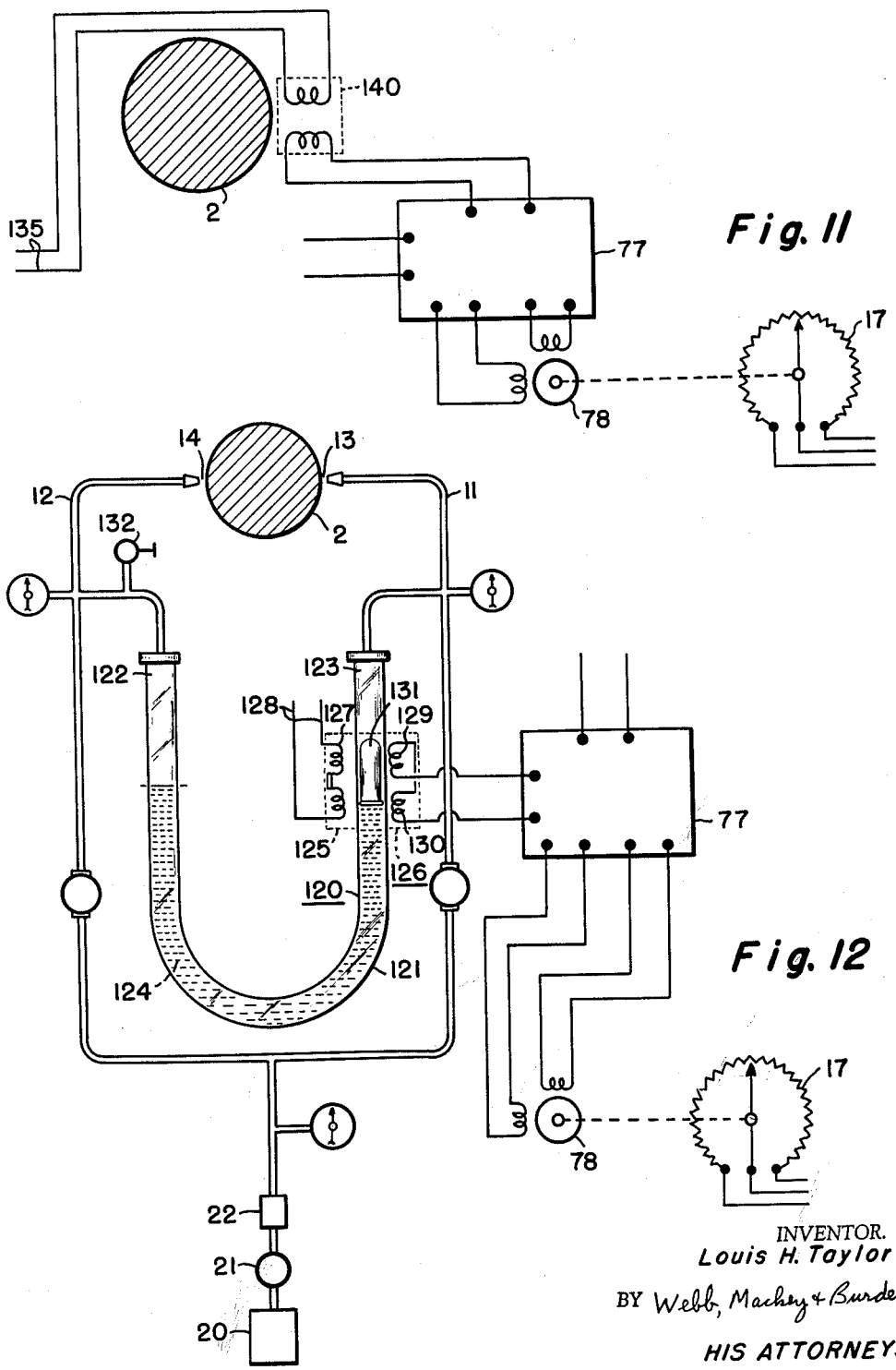

INVENTOR.
Louis H. Taylor

INVENTOR.
Louis H. Taylor
BY Webb, Mackey & Burden
HIS ATTORNEYS

INVENTOR.
Louis H. Taylor
BY Webb, Mackey + Burden
HIS ATTORNEYS

United States Patent Office 3,077,800
Patented Feb. 19, 1963

3,077,800
APPARATUS AND METHOD FOR DETECTING AND COMPENSATING FOR ROLL DEFLECTION ON A ROLLING MILL
Louis H. Taylor, Youngstown, Ohio, assignor to The Youngstown Research and Development Company, Youngstown, Ohio, a corporation of Ohio
Filed May 9, 1958, Ser. No. 734,321
17 Claims. (Cl. 80—32)

This invention relates generally to rolling materials such as metal strip, sheet, foil and strip-sheet and particularly to an apparatus and a method for detecting and compensating for deflection of the work rolls of a rolling mill for reducing metal strip, sheet, foil and strip-sheet to relatively thin gauges. While my invention is especially advantageous in mills in which neither of the work rolls is driven directly, it is applicable to many types of mills including the 3-high, 4-high, 5-high, 6-high, and other multiple cold mills. Hereinafter, I shall refer specifically to the 4-high driven back-up roll mills, but this is for illustrative purposes only and not by way of limitation.

In recent years, a 4-high rolling mill having driven back-up rolls has proved superior to many other types of rolling mills for cold rolling wide metal to thin gauges. The driven back-up roll 4-high rolling mill has a winding reel for receiving metal rolled thereon, for wrapping the metal into coils and for exerting a forward tension thereon. Usually, the mill also has an unwinding or feed reel which delivers the metal to be rolled to the roll pass and which exerts a back tension on the metal extending between the roll pass and the feed reel. Many of these driven back-up roll mills are the reversing type wherein the winding reel is the feed reel on alternate passes and the feed reel is the winding reel on alternate passes. Generally these mills have a flood lubrication system which directs large amounts of a liquid coolant onto the faces of the work rolls and of the backing rolls. In addition, the mills have a screw-down mechanism which raises and lowers the top backing roll and the top work roll relative to the bottom work roll to control the amount of reduction to be made on the strip rolled on the mill.

The 4-high mill with driven back-up rolls utilizes relatively small work rolls which readily bite into the metal being rolled and reduce screw pressures and permit making reductions which could not be made with larger rolls. These small work rolls have a diameter far below the minimum practical diameter and a slenderness ratio of length to diameter far above that of work rolls on 4-high mills with motor driven work rolls. Specifically, the 4-high driven back-up roll mill may successfully use 2" diameter work rolls having a 50" roll face. Use of these small work rolls is made possible by driving the backing rolls through conventional mill drives with the backing rolls driving the small work rolls by frictional engagement therewith and by supplying a part of the power required by tension on the delivered strip.

Because the 4-high driven back-up roll mills can employ small work rolls, tungsten carbide may be used economically for the work rolls. Rolls made from tungsten carbide have excellent wearing properties, outstanding resistance to roll flattening, and substantially exceed the properties of steel rolls in these respects. Although the initial cost of tungsten carbide rolls is greater than that of rolls made from steel, overall economics of rolling mill operation favor tungsten carbide rolls. For example, taking into consideration the initial cost of rolls, the time a rolling mill is out of operation due to roll change, the number of rollings on a set of rolls before grinding or reshaping is required, the cost of reshaping or regrinding rolls, the useful life of rolls, and the investment in roll inventory, tungsten carbide rolls are less expensive to use than steel rolls.

One shortcoming of the 4-high driven back-up roll mill, particularly where used for rolling wide strip, has been lateral deflection of the work rolls either in the direction of strip travel through the roll pass or in the opposite direction. Both work rolls may deflect in the same direction and one work roll may deflect in the direction of strip travel and the other work roll in the opposite direction. Lack of ability to quickly detect, to closely control, and to immediately compensate for this lateral deflection has hampered and held back full utilization of the 4-high driven back-up roll mill. Excessive and/or uncontrolled lateral deflection has brought about work roll breakage, poorly shaped strip, sheet or foil, and rolled metal which fails to meet tolerances and specifications. Furthermore, the lateral deflection has made use of tungsten carbide rolls inadvisable in some instances since such rolls have a resistance to deflection about one-third that of steel rolls of comparable dimensions and accordingly, are more prone to breakage when excessive deflection occurs. For example, a 1" diameter tungsten carbide roll having a 10" face will break if deflection exceeds 0.027"; whereas, the same size steel roll will withstand 0.083" deflection before breaking.

The foregoing points up the great importance of quickly and effectively controlling operation of the 4-high driven back-up roll mill to compensate for excessive work roll deflection. Furthermore, since the mill can operate at high speeds such as 1,000 to 2,000 f.p.m. or higher, it is desirable to compensate for work roll deflection to produce good shaped strip or sheet and to meet close tolerances and strict specifications and thus enjoy these performance features of the mill.

Two factors can cause lateral roll deflection. The first factor is an unbalance of forces acting upon the small work rolls of the mill and the second factor is the combination of forces generated by the screw-down mechanism acting upon the top backing roll and of the tolerances in the bearings and chocks for the backing rolls and the work rolls. My invention can detect roll deflection caused by either factor or a combination thereof and can effect compensation in operation of the rolling mill for the roll deflection.

Referring first to the lateral roll deflection caused by the unbalance of forces acting upon the work rolls, in the case of a driven back-up roll mill operating without back tension, two components of the mill, namely, the driven backing rolls and the winding reel, each exert forces upon the work rolls. Unless a balance is maintained between the forces exerted by the winding reel and by the driven backing rolls, lateral roll deflection occurs. The motor or motors which drive the backing rolls impart a torque thereto which is transmitted to the small work rolls by the frictional engagement of the backing rolls with the work rolls. The backing rolls rotate in a direction opposite to that of the direction of rotation of the working rolls and accordingly, the torque generated by the motor or motors driving the backing rolls urges the small work rolls to bow or deflect rearwardly or in a direction opposite to that of strip travel. On the other hand, the winding reel exerts a forward pull or tension upon the strip which extends through the strip back to the small work rolls where it urges the work rolls to deflect or bow forwardly or in the direction of strip travel. Thus, to compensate for or correct lateral roll deflection, there must be a balance between the forces exerted by the backing rolls and the tension provided by the winding reel.

Where the driven back-up roll mill has a feed or unwind reel as well as the winding reel, the feed reel exerts a back tension force extending through the strip to the small work rolls. This back tension force urges the work rolls to deflect in a direction opposite to that of strip travel. Thus, in the operation of a mill in which both forward and back tension are used, there must be a balance of forces among those applied to the work rolls by the winding reel, by the feed reel and by the driven backing rolls. Accordingly, appropriate control of the operation of one or more of these three components may be used to provide a balance of the forces acting upon the work rolls and compensate for lateral roll deflection.

Since each of the three components is motor driven, compensation for the roll deflection caused by the unbalance of forces results from control of the electric motors driving the components. Specifically, in my invention, an impulse generated by my apparatus in response to roll reflection is utilized to control one or more of these motors as will be described hereinafter.

One way of controlling the motors driving the backing rolls, the winding reel and the feed reel is regulation of armature voltage of the generators connected to these motors. Such regulation quickly and effectively brings about compensation for roll deflection. For example, if the torque applied by the driven backing rolls is too high, thus producing a rearward deflection, the armature voltage of the generator connected to the motor or motors driving the backing rolls may be lowered, thereby reducing the torque imparted to the work rolls to effect a balance of the forces exerted thereon. Conversely, if the torque is too low and a forward bowing of the rolls is present, then the armature voltage may be raised, thus increasing the torque and once again effecting the balance of forces exerted on the work rolls.

Where control of the motor or motors driving the winding reel is employed to maintain the balance of forces, regulation of the armature voltage of the generator connected to the motor or motors also brings about the balance of forces. This regulation of armature voltage functions in the same way as the regulation of the armature voltage of the generators for the motors driving the backing rolls.

Where regulation of the motor or motors driving the feed reel is used to compensate for roll deflection, the armature voltage of the generator connected to the feed reel motor or motors is controlled. If the work rolls deflect in the direction of strip travel, then the back tension force generated by the feed reel motors may be increased by raising the armature voltage of the feed reel generator. On the other hand, if the work rolls deflect in the direction opposite to strip travel, then the back tension may be decreased by lowering the armature voltage of the feed reel generator.

Control of both the torque applied to the backing rolls and the tension generated by the winding reel compensates for roll deflection in a shorter time than that elapsing when only one of the three components of the mill is used. Specifically, by controlling the armature voltage of the generator connected to the motor which drives the backing rolls and the armature voltage of the generator connected to the motor which drives the winding reel, I have lowered the time lag for correcting roll deflection once my apparatus detects a roll deflection. In this arrangement, I connect auxiliary fields of the two generators in parallel so that while one auxiliary field increases the armature voltage for its generator, the other auxiliary field decreases the armature voltage for its generator. Hereinafter, this arrangement will be more fully described. Separate control means can also be provided for each generator auxiliary field.

Considering the second factor which produces lateral roll deflection, namely, the combination of forces generated by the screw-down mechanism and of the tolerances in the roll bearings and in the chocks, the deflection resulting therefrom is either a deflection of one work roll in the direction of strip travel and of the other work roll in the opposite direction or a deflection of both rolls in the same direction. Even though utmost care is taken in machining roll necks, the roll neck bearings which support and mount the rolls and the chocks which mount the roll neck bearings, there is a tolerance in each bearing and each chock whereby the rolls are seldom in perfect axial alignment. Consequently, when the screw-down mechanism lowers the top work roll backed by the top backing roll down toward and sometimes into engagement with the bottom working roll, backed up by the bottom backing roll, to establish the amount of reduction to be made on the strip rolled on the mill, the screw-down mechanism exerts a force on the rolls. This force, in combination with the tolerances between the roll necks and the bearings and with the tolerances between the chocks and the mill housing may cause one of the work rolls to deflect laterally in the direction of strip travel and the other work roll in the opposite direction, although both work rolls may deflect in the same direction. The deflection occurs because of a small amount of space between the bearings and the roll neck and between the chocks and the mill housing resulting from the tolerances, thereby enabling the roll necks and/or the chocks to shift or move a small amount when subjected to the screw-down force. The screw-down force exerted by the screw-down mechanism may cause the chocks to shift in the housing and/or the rolls to shift in their bearings and away from axial alignment.

Compensation for lateral roll deflection caused by the second factor is brought about by control of the amount of torque delivered to each backing roll. Accordingly, each backing roll is independently driven and in some instances, its drive is independently controlled by regulation of the motor connected thereto as previously described.

Where both work rolls deflect in the same direction, the motor or motors driving the backing rolls compensate for the deflection by either increasing or decreasing the amount of torque delivered to the backing rolls. Depending upon the direction of deflection, the amount of torque delivered by the motor or motors is either increased or decreased to produce a correction for the work roll bowing. Where, however, one work roll deflects in one direction and the other work roll in the opposite direction, compensation for the deflection results from increasing the amount of torque delivered to the backing roll supporting the work roll which has deflected in the direction of strip travel and from decreasing the amount of torque delivered to the backing roll supporting the work roll which has deflected in the opposite direction.

Generally, rolling practice on the driven back-up roll mill requires holding the small work rolls in axial alignment with each other and in axial alignment with the backing rolls. Accordingly, bowing or deflection of the small work rolls in the direction of strip travel or in a direction opposite thereto causes my apparatus to generate the impulse which effects compensation for lateral roll deflection and thus changes mill operation to bring the work rolls back into axial alignment with the backing rolls.

There are some rolling practices on the driven backing roll mill which purposely use a small amount of lateral deflection in the work rolls, either forward or rearward, to better control the shape of the metal rolled. Such rolling practices comprise purposely deflecting both work rolls rearward or both work rolls forward or one work roll forward and the other rearward. One or both of the rolls so used sometimes have a small amount of shape such as a convex contour in the roll body is referred to as roll crown or a concave contour in the roll body. By increasing or decreasing the small amount of purposeful deflection, one shaped roll or a pair of shaped rolls can produce flat strip particularly where the strip before rolling was not uniform in thickness widthwise from edge to edge, or can produce a desired shape in the rolled strip. In other words, I can materially increase the utility of one shaped roll or a pair of shaped rolls to produce substantially flat strip from uneven shaped starting strip by increasing or decreasing the amount of purposeful deflection in the rolls and thus effect control of the contour of the roll pass. In this way, one shaped roll or a pair of shaped rolls can be made to do the work of a plurality of shaped rolls having different shapes or different amounts of substantially the same shape. In such rolling practices, it is important to maintain the small amount of purposeful roll deflection during rolling of a pass. My apparatus is useful to maintain this desired amount of purposeful roll deflection and generates impulses which compensate for deflection greater than or less than the desired amount.

Roll deflection also may be a problem on the 4-high driven work roll mill where generally some of the power required for rolling metal is provided by the winding reel which exerts a forward tension upon the delivered strip. My invention may be applied to such mills as well as to other types in which it is important to sense and correct for roll deflection.

The apparatus which I provide is highly sensitive and quickly responsive to small amounts of roll deflection. It can immediately detect a small amount of deflection whether caused by the unbalance of forces or by the combination of force generated by the screw-down mechanism and of the bearing and the chock tolerances or by both the unbalance of forces and the combination of force generated by the screw-down mechanism and of the bearing and the chock tolerances and then promptly generate an impulse which has characteristics of direction of deflection and of amount of deflection. The impulse generated is transmitted to the rolling mill where it controls operations so that the mill makes a fast compensation for the roll deflection.

Tests of my apparatus have shown that it can detect minute amounts of roll deflection such as 0.0001" and bring about compensation in mill operation for the deflection in a fraction of a second.

To detect and compensate for roll deflection, my invention, maintains a substantially constant length of gap between the face of a roll subject to deflection and a reference station spaced therefrom. The reference station is so positioned relative to the roll face that deflection shortens and lengthens the gap. To sense when deflection occurs I direct and impinge a medium of a given strength, such as a fluid under pressure or magnetic lines of flux, across the gap and upon the roll face. The reference station generally is the location of the means which I use to deliver the medium across the gap.

The position of the means for delivering and impinging the medium relative to the roll face is such that deflection produces a change in the strength of the medium delivered and impinged. This change comprises an increase or a decerase in the strength of the medium delivered and, in the case of a fluid under pressure, is caused by the roll deflection increasing or decreasing back preessure in the medium delivering means. Since the medium delivering means is placed so close to the roll face across the gap that impingement of the medium upon the roll face generates back pressure, roll deflection toward or away from the medium delivering means increases or decreases the back presure. The increase or decrease in back pressure is proportional to the amount of deflection and also indicates the direction of deflection.

Using the change in strength of the medium caused by the roll deflection, I generate an impulse which preferably has characteristics of both magnitude of deflection and direction of deflection. Then the impulse is transmitted to the mill controls and there utilized to regulate the mill operation to compensate for the deflection as will be described hereinafter.

The medium directed across the gap and impinged upon the roll face must be able to pierce the flood coolant and reach the roll face and must be unaffected by the flood coolant. Some mediums which are satisfactory are fluids under pressure including liquids and gases with air being particularly acceptable. Magnetic lines of flux also are a good medium.

Specifically, my apparatus comprises a means for directing and impinging a medium of a given strength upon a face of a roll of a mill for rolling metals. The roll and its face are subject to deflection and the directing and impinging means is spaced apart from the roll face and is positioned close thereto to form a gap therebetween. The medium travels from the directing and impinging means across the gap to the roll face. The position of the directing and impinging means relative to the roll face is such that deflection of the roll is toward and away from the directing and impinging means and shortens or lengthens the gap and is such that deflection of the roll produces a change in the strength of the medium impinged.

Connected to the directing and impinging means is a means which detects shortening or lengthening of the gap by the roll deflection by sensing the change in the strength of the medium. The detecting means also generates, from the change in strength, an impulse which preferably has characteristics of the direction of deflection and of the amount of deflection. The impulse controls operation of the mill to maintain a substantially constant length of gap between the roll face and the directing and impinging means and thereby effects compensation of the roll deflection. The impulse is transmitted to the mill controls in the manner described hereinafter.

A second embodiment of my invention employs two means for directing and impinging a medium upon a face of the roll with the two means being disposed on opposite sides of the roll face. Each means is spaced apart from the roll face and is positioned close thereto to form a gap therebetween. The medium travels across each a gap and impinges upon opposite sides of the roll face.

The position of the two means relative to the roll face is such that the roll deflection is toward one means and away from the other means and accordingly, shortens one gap while it lengthens the other gap. In addition, the position of the two means relative to the roll face is such that roll deflection produces an increase in the strength of the medium from one of the two means and a decrease in the strength of the medium from the other of the two means. Thus like the other apparatus described above, I employ means to generate an impulse from the change, an increase or decrease, in the strength of the medium, and use the impulse to control operation of the mill to compensate for the roll deflection.

Where one work roll deflects in one direction, a different amount than the other work roll deflects in the opposite direction, or where the work rolls may deflect in the same direction and also one work roll may deflect in one direction and the other work roll in the opposite direction, it is necessary to independently sense deflection of each work roll to independently drive each backing roll therefor and to independently control the motor driving each backing roll to bring about compensation for the deflection. Where, however, both work rolls deflect in the same direction, detection of deflection of only one of the two work rolls suffices for both generally deflect the same amount. Accordingly, there is no requirement to independently control each motor driving each backing roll and a single motor may be used for the back-up roll drive.

Where one work roll deflects in one direction the same amount as the other roll deflects in the opposite direction, detection of deflection of one roll suffices. Under such a condition, the signal which is generated by my apparatus upon detection of deflection is transmitted to the mill where it brings about an increase in the amount of torque delivered to one work roll and a decrease in the amount of torque delivered to the other work roll as will be described hereinafter.

When using fluid under pressure, such as air, for the medium, I take into account four factors which effect the operation of my apparatus. These factors are first, the shape of the stream of air issuing from a nozzle orifice and traveling across the gap to the roll face; second, the amount of air pressure; third, the distance between the nozzle orifice and the roll face; fourth, the diameter of the nozzle bore. In addition, I recognize that there is a relationship between the amount of air pressure, the distance between the orifice of the nozzle and the roll face and the diameter of the nozzle. Considering the first factor, i.e., the shape of the stream of air, I preferably deliver a solid and compact stream of air as distinguished from a diverging or spray-like stream so that a small amount of roll deflection will increase or decrease the pressure of the air stream and, consequently, the pressure in conduits connecting the nozzle to a source of air pressure. If the stream were diverging or spray-like, a small amount of roll deflection would not affect the air pressure in the conduit and thus, render my apparatus of little value. I have found that a nozzle which has a 15° to 20° taper towards its orifice delivers a satisfactory stream of air.

The second factor, namely, the pressure of air in the conduits, must be sufficiently great to form the proper shaped stream of air, to pierce the flood coolant and be unaffected thereby, and to be sensitive to changes generated by small amounts of roll deflection. In addition, the pressure must be such that the nozzle can be positioned apart from the roll face to detect roll deflection and must be sufficiently high to impinge upon the roll face with enough pressure so that a small amount of roll deflection will produce an instantaneous change in pressure in the conduit which is connected to a device (to be described hereinafter) which is sensitive to changes in pressure. I have found that air pressures ranging from about 10 pounds per square inch to about 20 pounds per square inch effect satisfactory results.

The third factor, i.e., the distance between the nozzle orifice and the roll face, is important for it must not be too great; otherwise, small roll deflections will not affect or sufficiently affect the air pressure in the conduits. On the other hand, the distance must be sufficient to allow for roll deflection. In other words, within the range of amounts of roll deflection occurring on the mill, the distance between the nozzle orifice and the roll face must be such that any change in roll deflection generates a change in fluid pressure in the conduit connected to the nozzle. Distances from about 0.005" to about 0.050" produce good results.

As to the fourth factor, namely, the diameter of the nozzle, I have found that diameters ranging from about 0.025" to about 0.075" effect satisfactory operation of my apparatus. The nozzle diameter must be sufficiently large to provide a stream of air which spans the distance from the nozzle orifice to the roll face and impinges upon the roll face with enough force so that small roll deflections toward or away from the nozzle generate a change in pressure in the conduit or conduits.

Among three of the four factors discussed above, namely, the amount of pressure in the conduit, the distance between the orifice of the nozzle and the roll face, and the diameter of the nozzle, there is a relationship wherein for a given distance between the orifice and the roll face, the nozzle diameter and the air pressure must be sufficient to produce the solid compact stream of air which impinges upon the roll face with sufficient force so that a small amount of change in roll deflection produces a change in air pressure in the conduits.

Since my apparatus utilizes changes in the strength of the medium to compensate for roll deflection, the medium delivering means must be located relative to the roll face so that as the roll deflects in one direction or the other, the roll face moves toward or away from the means and in so moving, generates a change in strength of the medium. The change in strength for fluid under pressure is caused by increasing or decreasing ability of the fluid to escape from the nozzle. In other words, as the roll face advances toward the nozzle, back pressure in the conduit increases for the fluid cannot escape as readily therefrom as when the roll face retreats from the nozzle and thereby reduces the back pressure in the conduits caused by proximity of the roll face to the nozzle. The nozzles are preferably located in the plane of deflection of the small work roll and positioned so that the angle of impingement of the stream of fluid issuing from the nozzle strikes the roll face at an angle substantially normal thereto. I have found that the nozzles need not be disposed in the plane of deflection of the roll but may be mounted at an angle thereto where the nozzle is positioned so that a small amount of change in roll deflection brings the roll face either toward or away from the nozzle. Preferably, the nozzles used in my apparatus are located so that the stream of fluid strikes the roll face at an angle substantially normal thereto but variations from the normal angle produce satisfactory results provided that small amounts of change in roll deflection produce changes in fluid pressure in the conduits.

In the accompanying drawings, I have shown preferred embodiments of my invention in which:

FIGURE 11 is a schematic view of a seventh embodiment of my invention;

FIGURE 12 is a schematic view of a modification of a transducer used by my invention;

Figure 1:
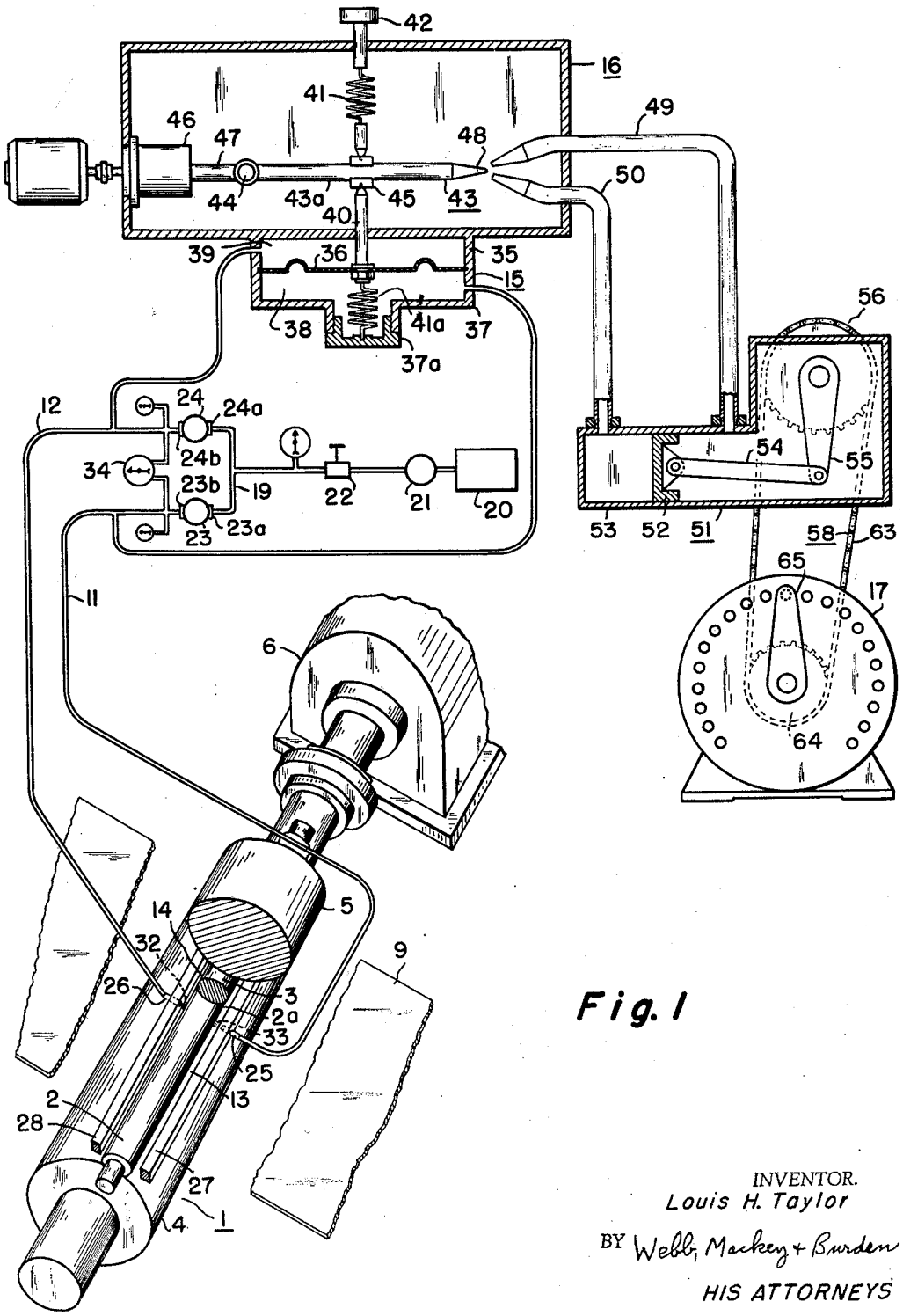
FIGURE 1 is a schematic view of one embodiment of my invention showing the mill rolls in axial alignment.
Figure 2:
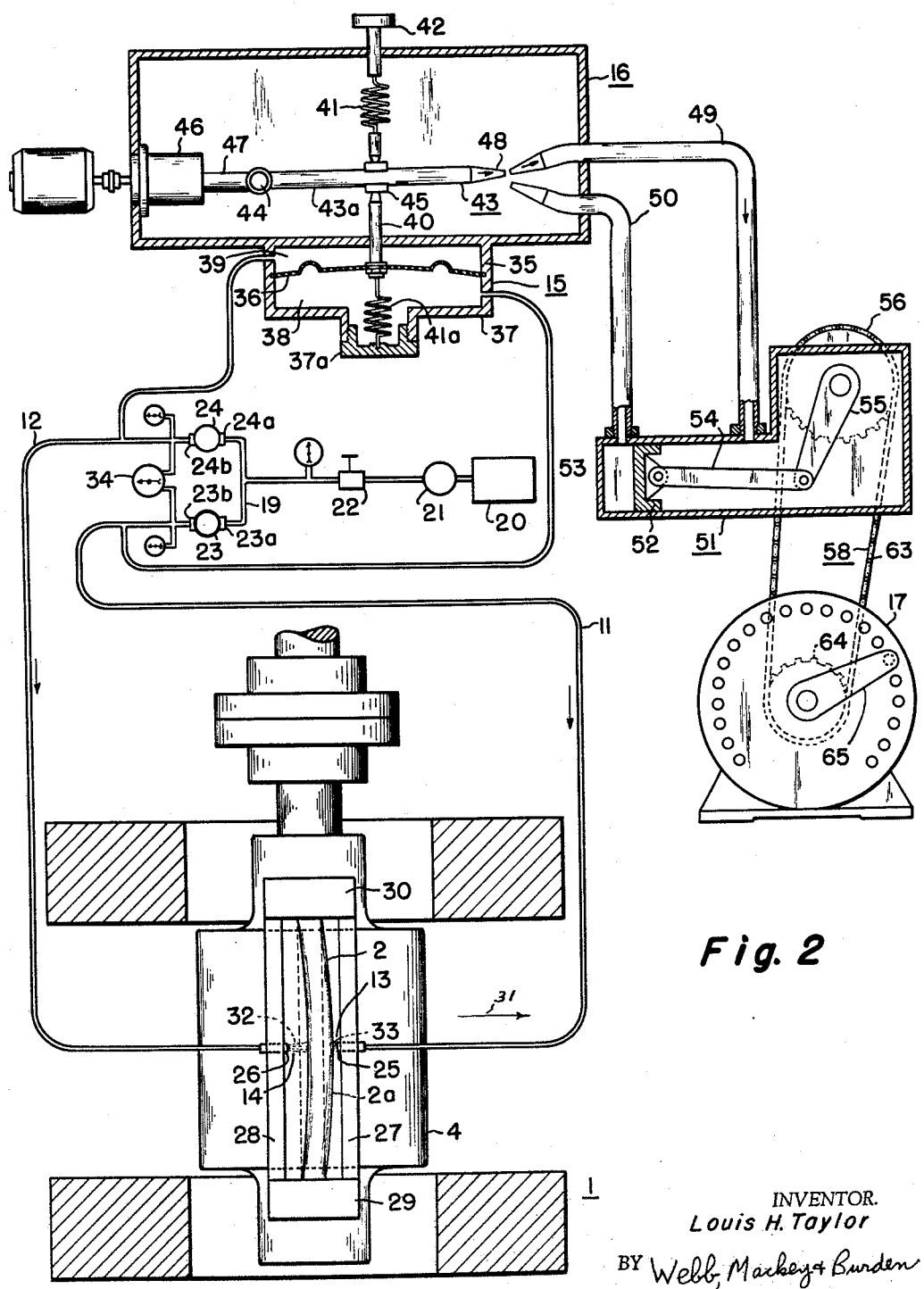
FIGURE 2 is a schematic view similar to FIGURE 1 but showing one of the work rolls bowed or deflected in the direction of strip travel.
Figure 3:
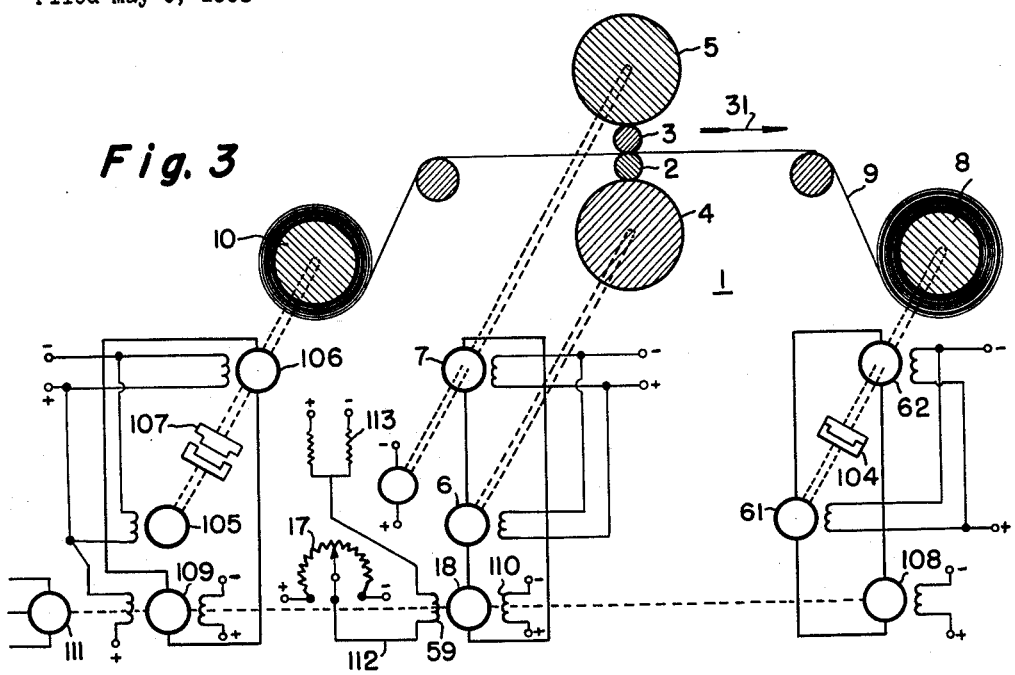
FIGURE 3 is a combination schematic and wiring diagram showing how the apparatus of FIGURE 1 is connected to the motors for driving the back-up rolls to compensate for work roll deflection.

Referring to FIGURES 1, 2 and 3, I have shown my apparatus applied to a driven backing roll mill 1 of the reversing type which has a pair of small work rolls 2 and 3 and a pair of backing rolls 4 and 5. Backing roll 4 supports and drives work roll 2 through frictional engagement therewith and backing roll 5 supports and drives the other working roll 3 through frictional engagement therewith. Electric motor 6 drives the lower backing roll 4 and electric motor 7 drives the upper backing roll 5. On the right side of the mill, as shown in FIGURE 3, is a winding reel 8 which wraps up strip 9 rolled on the mill into a coil and exerts a forward tension thereon. An unwinding or feed reel 10 on the left side of the mill, as shown in FIGURE 3, delivers strip to the small work rolls and exerts a back tension thereon. On alternate passes, the winding reel functions as the feed reel and, correspondingly, the feed reel functions as the winding reel.

As shown in FIGURES 1, 2 and 3, my apparatus comprises a pair of conduits 11 and 12 for impinging jets of air under pressure upon the roll face 2a of the lower work roll 2. The two conduits 11 and 12 are spaced apart from the roll face 2a to form two gaps 13 and 14 therebetween. Connected to the two conduits is the impulse generator 15 which detects changes in strength of the air pressure in the conduits caused by deflection of the lower work roll 2 and which converts the changes into an impulse. Connected to the impulse generator 15 is an amplifier 16 which increases the magnitude of the impulse and which operates a buck-boost potentiometer rheostat 17 for regulating the generator 18 connected to the motors 6 and 7 driving the back-up rolls 4 and 5.

A pipe 19 interconnects the two conduits 11 and 12 and connected to the pipe 19 is a compressor 20 which supplies air under pressure to the two conduits through a valve 21, a pressure regulator 22 and needle valves 23 and 24.

The conduits 11 and 12 have nozzles 25 and 26 respectively which are disposed in safety bars 27 and 28 respectively. The two safety bars are located on opposite sides of the lower work roll 2 and are spaced apart therefrom and close thereto to form the two gaps 13 and 14. As shown in FIGURE 2, the ends of the safety bars are mounted in work roll bearing cases 29 and 30 which support and position the bars relative to the lower work roll.

The two nozzles 25 and 26 are substantially opposite the center line of the lower work roll 2 and substantially midway between the ends of the roll face 2a. Satisfactory results in the use of my apparatus may be obtained when the nozzles are located closer to one end of the roll face than the other end or when the nozzles are not directly opposite the roll center line but a little below or a little above it.

In positioning the nozzles relative to the work roll face, it is important that the nozzle orifice be so positioned that deflection or bowing of the work roll brings one side of the roll face closer to one nozzle orifice and further from the other nozzle orifice, thereby shortening one gap and lengthening the other gap. For example, when deflection of the lower work roll 2 is in the direction of strip travel indicated by arrow 31 (FIGURE 2) gap 13 is shortened an amount corresponding to the amount of deflection and gap 14 is lengthened an equal amount.

Also each nozzle is located close to the roll face 2a across the respective gap so that deflection of the roll 2 produces a change in the strength of the air jets 32 and 33, i.e., the pressure of the air forming the jet. Preferably the length of the gaps 13 and 14 between the nozzles and the roll face 2a is from about 0.005" to about 0.050" when the work rolls and backing rolls are in axial alignment as shown in FIGURE 1. In other words, with the work rolls 2 and 3 in axial alignment with the backing rolls 4 and 5 as shown in FIGURE 1, each nozzle has a position across the gaps 13 and 14 such that impingement of the jets of air against the roll face 2a produces equal amounts of back pressure in the conduits 11 and 12. Within the range of deflection of the work roll 2, impingement of the air jets 32 and 33 against the roll face 2a produces back pressure with the back pressure generated being less when the roll has deflected away from nozzle 26 to lengthen gap 14 and being more when deflection is toward nozzle 25 to shorten gap 13. This back pressure affects the amount of pressure of air forming a jet and as the gap shortens, the back pressure increases and as the gap lengthens, the back pressure decreases. Thus, as the work roll 2 deflects towards nozzle 25, back pressure in conduit 11 increases thereby reducing the strength of the air jet 33 and increasing pressure in the conduit 11. Correspondingly, the back pressure in the other conduit decreases thereby increasing the strength of the air jet 32 and decreasing the pressure in the conduit 12. This change in strength of the air jets and the change in pressure in the conduits is used for detection of roll deflection. The magnitude of the change is proportional to the amount of deflection and the direction of the change in one conduit, an increase or a decrease in pressure, indicates the direction of the deflection.

Connected into the conduits 11 and 12 is a differential pressure gauge 34 which indicates changes in air pressure in the two conduits. If desired, the differential gauge can be located at an operator's station and there used by the operator for manual regulation of the mill controls to compensate for roll deflection. However, faster and more effective compensation results from automatic regulation of mill operation as described hereinafter.

To convert the changes in air pressure in the two conduits 11 and 12 produced by roll deflection into an impulse for controlling the operation of the mill, I connect the two conduits to the impulse generator 15. The generator 15 comprises a transducer 35 having a diaphragm 36 disposed in an air-tight casing 37 and dividing the casing into two chambers 38 and 39. The diaphragm 36 which seals the chambers one from the other is sensitive to changes in air pressure within both chambers 38 and 39. Conduit 11 conveys air under pressure to one side of the diaphragm and into chamber 38 and the other conduit 12 delivers air under pressure to the other side of the diaphragm and into the other chamber 39.

By maintaining a higher pressure on the input sides 23a and 24a of the two needle valves 23 and 24 respectively, than on the ouput sides 23b and 24b, I materially increase the sensitivity of my control. Regulation of the two needle valves brings about a higher pressure in pipe 19 than in each conduit 11 and 12. I have found that a pressure differential in pipe 19 versus conduits 11 and 12 of from about 1 lb./sq. in. to about 10 lb./sq. in. and preferably about 5 lb./sq. in., produces good sensitivity. On one test, a 10 lb./sq. in. differential produced a difference of 12" of mercury in a U-tube for 0.005" deflection in a 0.010" initial gap where a 0.067" nozzle orifice was used. With no pressure differential, a difference of ½" in mercury in the U-tube was observed for the same amount of deflection in the 0.010" initial gap with a 0.067" nozzle.

When the lower work roll is in axial alignment with the backing rolls as shown in FIGURE 1, the air pressure in both chambers 38 and 39 is equal and the diaphragm is maintained in its neutral position. When the lower work roll deflects in the direction of strip travel as shown in FIGURE 2, air pressure increases in conduit 11 and hence, in chamber 38 due to the roll face 2a of the lower work roll 2 advancing toward the orifice of nozzle 25 and thus increasing back pressure in the conduit 11. Simultaneously, the roll face moves away from the orifice of the other nozzle 26, thus reducing back pressure in the conduit 12 and bringing about a decrease of air pressure in the chamber 39, whereupon the diaphragm 36 moves upwardly as shown in FIGURE 2.

Connected to one side of the diaphragm 36 and extending through a wall of the casing 37 is one end of a rod 40 whose other end is joined to an adjustable calibrated compression spring 41. The spring 41 is joined to an adjuster 42 which regulates compression in the spring and thereby movement of the rod within a desired range of air pressure changes. Disposed between the other side of the diaphragm 36 and a cap 37a of the casing 37 and positioned in the chamber 38 is a second calibrated compression spring 41a. When the pressure on both sides of the diaphragm 36 is equal and/or when there is no roll deflection, the two calibrated springs 41 and 41a maintain the diaphragm 36 in neutral position, i.e., the position shown in FIGURE 1. Also, after the diaphragm has moved upward or downward, viewing FIGURE 1, in response to a pressure differential in the chambers 38 and 39, the two calibrated springs return the diaphragm to its neutral position when the pressure differential is removed.

A jet pipe unit 43 comprises a jet pipe 43a which has a pivot 44 at one end thereof and which extends through a bearing block 45 which is a part of the rod 40. An oil pump 46 delivers oil under pressure to the jet pipe 43a through a conduit 47. As shown in FIGURE 1, when the air pressure in both chambers 38 and 39 is equal, the jet pipe is in a neutral position with its nozzle 48 directed between two distributor pipes 49 and 50 so that neither pipe receives more oil under pressure than the other. When diaphragm 36 moves upwardly as shown in FIGURE 2, the jet pipe is pivoted about its pivot 44 by the movement of rod 40 and then delivers more oil under pressure into distributor pipe 49 than into distributor pipe 50.

Each distributor pipe is connected into a work cylinder unit 51 with distributor pipe 49 delivering oil flowing therethrough on one side of a reciprocating piston 52 traveling in a cylinder 53. The other distributing pipe delivers oil flowing therethrough on the opposite side of the piston.

A connecting link 54 joins the piston 52 to one end of a crank arm 55 attached to a sprocket 56. Thus, as the piston reciprocates within the work cylinder 53, the connecting link 54 rotates the sprocket 56 through clockwise and counterclockwise arcs.

This work cylinder unit 51 operates a buck-boost potentiometer rheostat 17 through a chain drive and sprocket assembly 58. The buck-boost potentiometer rheostat is electrically connected to an auxiliary field winding 59 of the generator 18 which controls operation of the two motors 6 and 7 which drive the backing rolls. The buck-boost potentiometer rheostat 17 regulates the output armature voltage of the generator 18 and thereby effects compensation for roll deflection through control of the back-up roll drive.

Referring to the chain drive and sprocket assembly 58, a drive chain 63 connects sprocket 64 on the potentiometer rheostat to the sprocket 56 of the work cylinder unit 51. Since crank arm 55 of the work cylinder operates sprocket 56 in response to movement of the piston 52, the sprocket 56 of the work cylinder unit 51 in turn rotates the sprocket 64 of the potentiometer through the drive chain 63. Connected to the sprocket of the buck-boost potentiometer is a control arm 65 which swings through clockwise and counterclockwise arcs and thereby controls the output armature voltage of the generator 18. As shown in FIGURES 1 and 2, when the control arm swings in a clockwise direction, it effects a boost of the armature voltage output of the generator 18, and when it moves in a counterclockwise direction, it bucks the armature voltage output of the generator and thus lowers the voltage delivered to the motors driving the backing rolls.

Referring to FIGURES 1 and 2, roll deflection in the direction of strip travel increases pressure in conduit 11, thereby forcing diaphragm 36 upwardly, as shown in FIGURE 2, and thus generating an impulse which is amplified by the jet pipe and work cylinder combination. Upward movement of the diaphragm 36 causes the rod 40 to pivot jet pipe 43 so that it delivers more oil under pressure into distributor pipe 49 than into the other distributor pipe 50. Whereupon, piston 52, motivated by a differential in oil pressure, travels to the left, as shown in FIGURE 2, and swings crank arm 55 through a clockwise arc, thereby causing drive chain 63 and sprocket 64 to swing control arm 65 of the potentiometer rheostat in a clockwise direction. When this control arm 65 moves from its neutral position in a clockwise direction, the output armature voltage of the generator 18 is boosted and compensation for roll deflection in the direction of strip travel results as will be described hereinafter.

Figure 6:
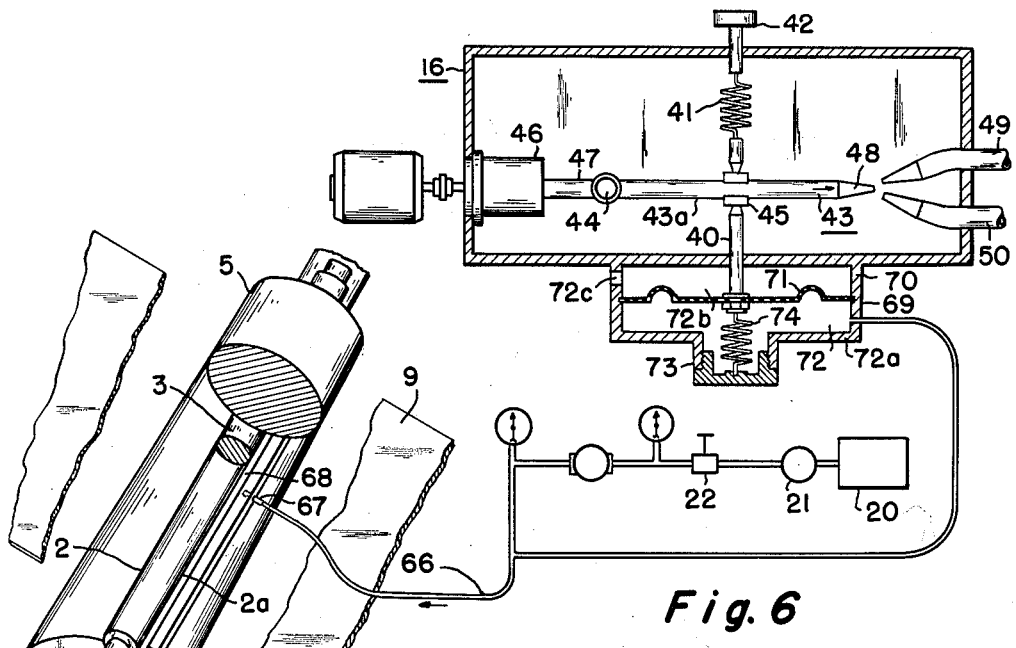
FIGURE 6 is a schematic view of a second embodiment of my invention.

FIGURE 6 shows a second embodiment of my invention wherein I use a single conduit 66 and its nozzle 67 for impinging a solid compact stream of air under pressure against the face 2a of the small work roll 2. The nozzle 67 is spaced apart from and close to the roll face 2a to form a gap 68 across which the stream of air travels to the roll face. The position of the nozzle 67 relative to the roll face 2a and the length of the gap 68 are substantially as described for the embodiment of FIGURE 1.

The conduit 66 is connected to an impulse generator 69 similar to impulse generator 15 with the exception that the transducer 70 of the impulse generator 69 has its diaphragm 71 forming a single airtight chamber 72 in the casing 72a and a second chamber 72b with an air vent 72c. Connected to this chamber 72 is the conduit 66 whereby the diaphragm 71 detects changes in air pressure in the conduit 66 and generates an impulse in response to changes such as those previously described. Seated between the diaphragm 71 and a cap 73 of the casing 72a is a spring 74 which opposes the force of air under pressure in the chamber 72. In other words, when the work roll 2 is in axial alignment with the backing rolls 4 and 5 and there is no work roll deflection, the force exerted upon the diaphragm by the air pressure in the chamber 72 is equal to the force exerted upon the diaphragm 71 by the spring 74. Accordingly, the diaphragm remains in its neutral position, i.e., the position shown in FIGURE 6. When the small work roll 2 deflects in the direction of strip travel indicated by the arrow 31, air pressure in the chamber 72 increases and the diaphragm 71 moves upwardly, as shown in FIGURE 6. This upward movement generates an impulse proportional to the amount of roll deflection and directional with deflection of the roll 2 whereupon the impulse is amplified by the jet pipe unit 43 and transmitted to the buck-boost potentiometer rheostat 57.

Should the roll 2 deflect in the direction opposite to strip travel, the air pressure in the single chamber 72 decreases and the spring 74 moves the diaphragm 71 downwardly, as shown in FIGURE 6, thereby generating an impulse proportional to the amount of roll deflection and indicating the direction of roll deflection. Except for the single conduit and single chamber the embodiment of FIGURE 6 is the same as and operates in the same manner as the embodiment of FIGURES 1 and 2.

Figure 7:
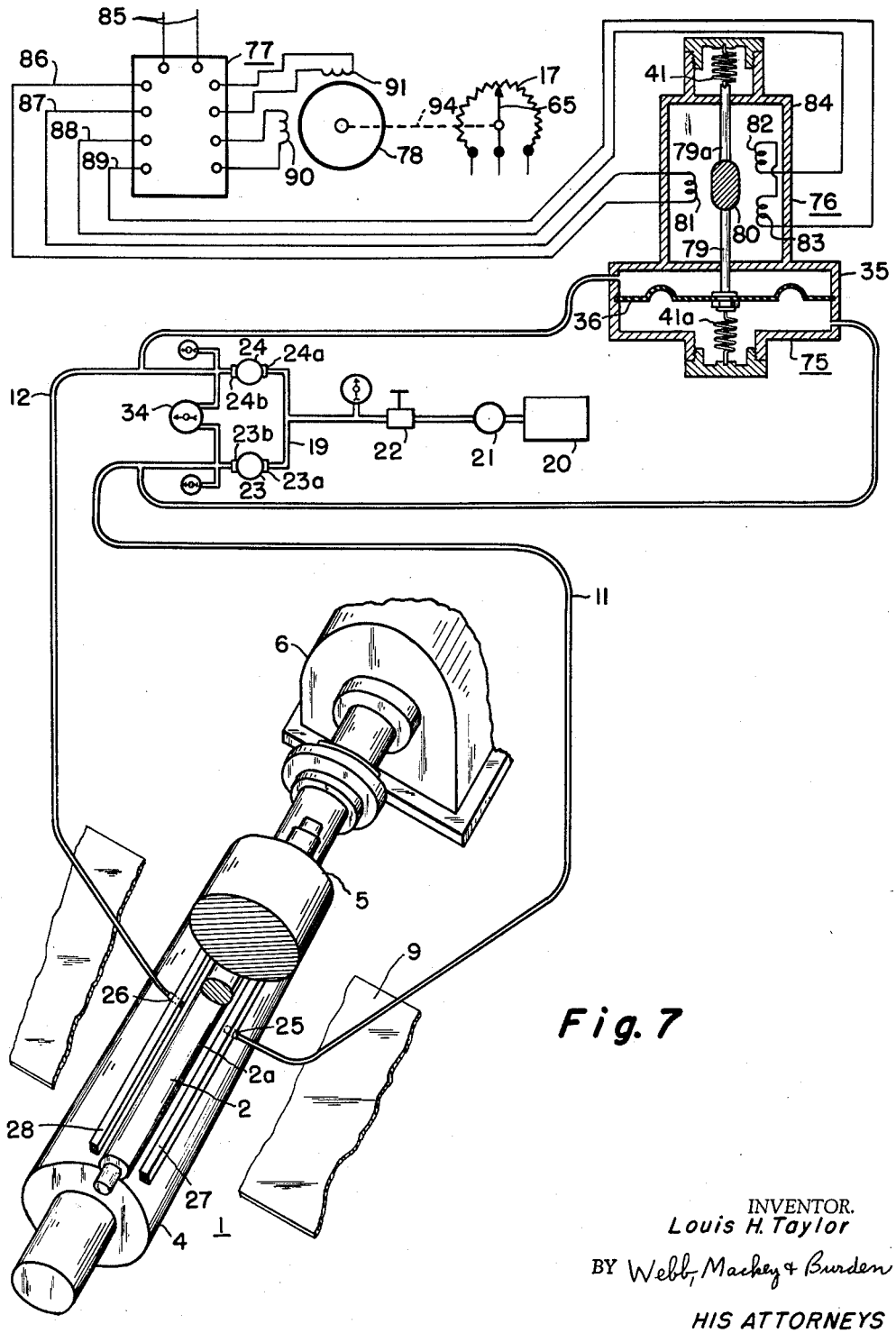
FIGURE 7 is a schematic view of a third embodiment of my invention.

A third embodiment of my invention shown in FIGURE 7 employs an impulse generator 75 comprising the transducer 35, a linear variable differential transformer 76, a servo amplifier 77 and a servo motor 78 with the servo amplifier and the servo motor performing the functions of the jet pipe unit 43 and work cylinder unit 51. The embodiment of FIGURE 7, like that of FIGURES 1 and 2, has two conduits 11 and 12, each carrying a nozzle 25 and 26 respectively, with the nozzles straddling the small work roll 2 and disposed relative to its face 2a, the same as the nozzles of the embodiment of FIGURE 1. The two conduits are connected to the transducer 35 and, thus, deflection of the small work roll 2 towards or away from one of the nozzles brings about movement of the diaphragm 36 in response to changes in air pressure in the conduits 11 and 12. Movement of the diaphragm 36 operates the linear variable differential transformer 76 through a non-magnetic rod 79 carrying magnetic core 80 on one of its ends. The two springs 41 and 41a maintain in, and return the diaphragm 36 to, its neutral position as previously described. Spring 41 has one of its ends affixed to an extension 79a of the non-magnetic rod 79 to avoid affecting the transformer 76.

The transformer 76 comprises a primary winding or coil 81 and two secondary windings or coils 82 and 83 mounted in a hollow cylinder 84 of nonmagnetic material. The magnetic core 80 and the nonmagnetic rod 79 travel lineally between the primary winding 81 and the two secondary windings 82 and 83 in response to movement of the diaphragm 36 caused by the roll deflection. An alternating current power source 85 energizes amplifier 77 and conductors 86 and 87 connect the amplifier 77 to the primary winding 81. Conductors 88 and 89 join the secondary windings to the amplifier 77.

Energization of the primary winding by the power source 85 from the amplifier 77 includes voltages in the two secondary windings in proportion to the magnetic couplings between the primary and the secondary windings through the magnetic core 80 which provides a path for the magnetic flux linkages between the windings. When the magnetic core is in its central or neutral position between the primary and the secondary coils, the voltages induced in the secondary windings are equal due to the symmetry of the physical location of the coils.

The two secondary coils are connected in series opposition so that the two voltages in the secondary circuit are opposite in phase and the net output of the transformer is the difference between these two voltages. Thus, when the magnetic core is in its neutral position, the output voltage from the secondary coils is zero but when the magnetic core is moved upwardly or downwardly, as shown in FIGURE 7, in response to movement of the diaphragm 36 caused by roll deflection, there is a net voltage output.

When the diaphragm 36 moves the core from its neutral position, the voltage induced in the coil 82 towards which the core moves increases while the voltage induced in the other coil 83 decreases. Thus, a differential voltage output from the transformer results and this voltage is lineally proportional to the amount of the core movement and indicates the direction of roll deflection. Movement of the core in the opposite direction beyond its neutral position produces a similar voltage increase in the coil 83 and a voltage decrease in the other coil 82, but with the phase of the voltage output shifted 180°. It is this shift of 180° in the phase of the voltage output which represents the direction of roll deflection. The voltage output is the impulse which I use to compensate for the roll deflection.

The amplifier 77 increases the voltage output of the transformer and delivers the output to the servo motor 78 which has two field windings, 90 and 91. When the field windings 90 and 91 are energized in proper phase relationship, the rotor of the motor rotates in one direction and when one of the two field windings 90 and 91 is energized in an opposite phase relationship, the rotor of the motor rotates in the opposite direction. The direction and amount of rotor rotation is governed by the amount of voltage output and by the phase relationship of the secondary coils 82 and 83, to compensate for the roll deflection.

A mechanical drive 94 connects the servo motor 78 to the buck-boost potentiometer rheostat 17 which regulates the output armature voltage of the generator 18 as will be described hereinafter. Thus, when the servo motor rotor travels in a clockwise direction, it moves control arm 65 of the potentiometer rheostat 17 in a clockwise direction to produce an increase in the output armature voltage of the generator 18 and when the servo motor rotor travels in a counterclockwise direction, it swings the control arm 65 in a counterclockwise direction and brings about a decrease in the output armature voltage of the generator.

In place of the diaphragm transducer 35, I employ a U-tube transducer 120 as shown in FIGURE 12. The U-tube transducer comprises a U-tube 121 made from a nonmagnetic material, preferably glass, with two arms 122 and 123. Inside the U-tube is a column of mercury 124. Connected to arm 122 is conduit 12 and connected to arm 123 is conduit 11 so that the mercury column in each arm of the U-tube is subjected to changes in fluid pressure in the two conduits caused by roll deflection and thereby, the U-tube transducer 120 detects roll deflection.

Mounted upon an adjustable spool 125 which is made from a nonmagnetic material such as a ceramic and which slips over the arm 123 is a differential transformer 126, similar to and operating in the same way as the differential transformer 76. The differential transformer 126 has its primary coil 127 connected to an A.C. power source 128 and its secondary coils 129 and 130 connected to the servo amplifier 77. The servo amplifier 77 controls the servo motor 78 which in turn operates the buck-boost potentiometer rheostat 17 as previously described.

The magnetic core 131 of the transformer floats on the mercury column in the arm 123 and its up and down travel generated by changes in pressure in the two conduits 11 and 12 produce an impulse for compensating for roll deflection as described herein.

When the work roll has no deflection and the fluid pressure in the two conduits 11 and 12 is equal, the center of the floating magnetic core 131 lines up with the center of the primary coil 127 and the two secondary coils 129 and 130 so that there is no voltage output. The spool is adjustable on the arm 123 so that the magnetic core 131 may be lined up with the primary and secondary coils when there is no roll deflection and the fluid pressure is equal in both conduits.

Where a single conduit is used, one of the two arms 122 and 123 is connected to the atmosphere through a valve 132 and the transducer operates in the same way.

Figure 8:
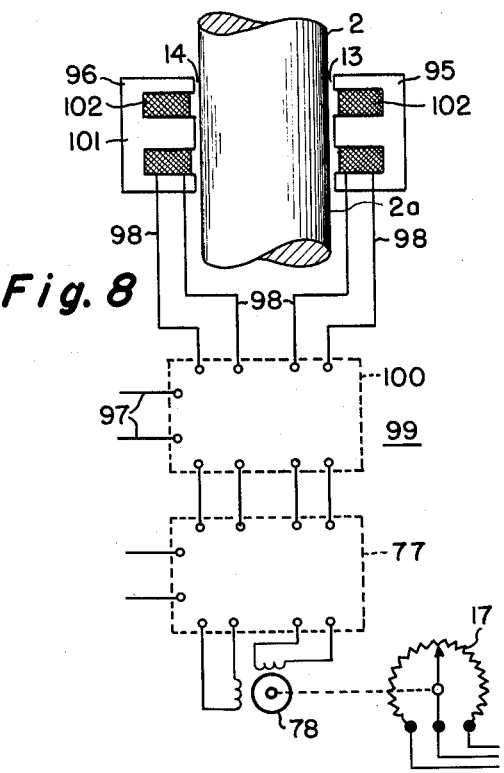
FIGURE 8 is a schematic view of a fourth embodiment of my invention.

FIGURE 8 shows a fourth embodiment of my invention which utilizes electromagnetic induction to induce eddy currents in the surface of the small work roll 2 where high frequencies such as 400 cycles and higher are used or to effect changes in reluctance in a gap between an electromagnetic inductor and the roll face where low frequencies such as under 400 cycles are used. As shown, I locate two electromagnetic inductors 95 and 96, one on each side of the small work roll 2, and connect each inductor to an alternating current power source 97. Each inductor is spaced apart from the work roll 2 to provide the small gaps 13 and 14 between the roll face and the leading face of each inductor and each inductor generates magnetic lines of flux which travel from the inductor across the gaps to the roll face. When the small work roll 2 is in axial alignment with the backing rolls and when it has no lateral deflection, the gaps 13 and 14 between the roll face and each inductor are substantially equal in length. Thus, for substantially equal length air gaps, impedance of the two inductors is matched and correspondingly, so long as the gaps between the roll face and each inductor are substantially equal in length, the current inputs to the inductors are equal. However, when the roll deflects towards one inductor and away from the other, the current input to the inductor towards which the roll deflects decreases where the reluctance or self-induction method is used and increases where the eddy current or mutual induction method is used; and correspondingly, the current input to the inductor away from which the roll deflects increases where the reluctance method is used and decreases where the eddy current method is used.

I have found that a gap between the roll face and the leading face of the inductor of about 0.005″ to about 0.025″ effects satisfactory detection of roll deflection.

The eddy current or mutual induction method is adapted for rolls made from materials having low ferro-magnetic properties such as tungsten carbide. On the other hand, the reluctance or self-induction method is suitable for rolls made from materials having good ferro-magnetic properties such as steel. However, for detecting and compensating for roll deflection, I utilize the change in strength of the magnetic lines of flux directed across the gap or gaps irrespective of whether the self or mutual induction method is used.

As to the mutual induction method, the gap between the roll face and the leading face of the inductor must be of such length when there is no roll deflection and the rolls are in axial alignment that, for the range of roll deflection toward and away from the inductor, magnetic flux linkages travel across the gap and impinge against the roll face and there induce eddy currents which generate a counterflux opposing the flux linkages traveling from the inductor to the roll face and thereby decreasing the strength of the flux linkage. The amount of counterflux generated increases as the gap shortens and decreases as the gap lengthens in accordance with roll deflection, thereby producing changes in the nature of increases and decreases in the strength of the magnetic flux linkages traveling from the inductors across the gap to the roll face. Accordingly, an increase in the counterflux decreases the strength of magnetic flux linkages from the inductor toward which the roll deflects and brings about an increase in the current input to that inductor. Correspondingly, a decrease in the counterflux increases the strength of the magnetic flux linkages from the inductor away from which the roll deflects and produces a decrease in the current input to that inductor. I have found that the amount of current increase and decrease generated by the roll deflection is proportional to the amount of deflection of the roll subjected to the inductors. Thus, by sensing changes in current input to the inductors I detect roll deflection and generate an impulse which is proportional in magnitude to the amount of deflection and which has characteristics of direction of deflection.

As to the self-induction method, the gap between the roll face and the leading face of the inductor must be of such length, when there is no roll deflection and the rolls are in axial alignment, that, for the range of roll deflection toward and away from the inductor, magnetic flux linkages travel across the gap and impinge against the roll face and there generate a countervoltage of self-induction. The countervoltage opposes the voltage impressed upon the inductors and thus, decreases the input current to the inductors. When a roll deflects towards an inductor and the gap shortens, the strength of the flux linkages from the inductor to the roll increases, thus producing an increase in the countervoltage of self-induction. The increase in the countervoltage effects a decrease in the voltage delivered to the inductor and thereby brings about a decrease in the input current to the inductor. On the other hand, when the roll deflects away from an inductor and the gap lengthens, the strength of the flux linkages from the inductor to the roll decreases and thereby causes a decrease in the countervoltage of self-induction. The decrease in the countervoltage produces an increase in the voltage impressed on the inductor and thus effects an increase in the input current to the inductor.

I have found that the amount of current increase and decrease generated by the roll deflection and resulting from self-induction is proportional to the amount of deflection of the roll subjected to the inductor. Accordingly, by sensing the changes in current input to the inductors, I detect roll deflection and generate an impulse which is proportional in magnitude to the amount of deflection and which has characteristics of direction of deflection.

Both inductors are electrically connected by conductors 98 to an impulse generator 99 comprising an amplifier 100, the amplifier 77 and the servo motor 78 with the amplifier 100 detecting changes in current input to the two inductors and thereby sensing roll deflection. The amplifier, upon detection of an increase in current input to one inductor and a decrease of current input to the other inductor, generates an impulse whose character is dependent upon which direction roll deflection occurs and which is proportional in magnitude to the amount of deflection. This impulse is transmitted to the servo amplifier 77 heretofore discussed.

The servo amplifier 77 increases the magnitude of the impulse and transmits it to the servo motor 78 which operates the buck-boost potentiometer rheostat 17. The servo motor causes the buck-boost potentiometer rheostat 17, which is connected to the auxiliary field 59 of the back-up roll drive generator 18, to increase or decrease the output armature voltage of the generator 18 to compensate for the roll deflection.

Each inductor comprises an E-shaped core 101 made of thin laminations with an exciting coil 102 located on the center leg of the core. Both the coil and core are sealed by suitable materials such as plastics resistant to oil and/or water and the cores are disposed in safety bars located opposite the work roll 2. The inductor core 101 may be circular and be made from magnetic powder metals and a suitable binder.

The location of the inductors relative to the roll face requires taking into consideration the same factors previously discussed in relation to positioning the nozzles 25 and 26 which impinge jets of fluid under pressure on the roll face.

The flood cooling system, where used, dissipates heat generated by the eddy currents.

Figure 9:
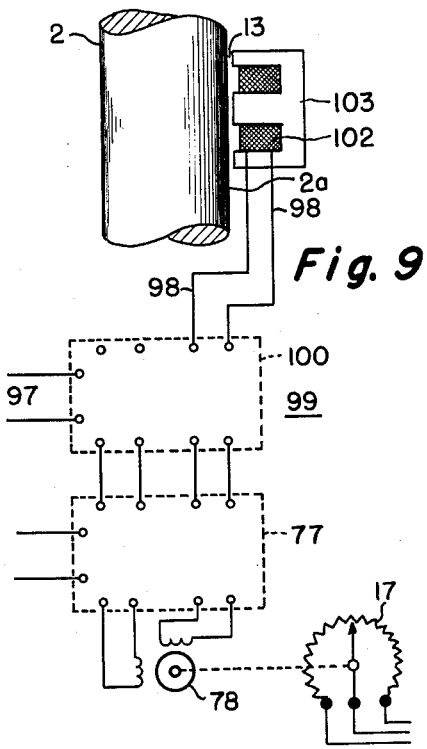
FIGURE 9 is a schematic view of a fifth embodiment of my invention.

A single inductor 103 positioned on one side of the small work roll face 2a, as shown in FIGURE 9, satisfactorily detects roll deflection. In using a single inductor, the current input to the inductor when there is no work roll deflection and the work roll is in axial alignment with the backing rolls is matched with a standard current of the amplifier. When there is roll deflection towards or away from the inductor, there is a resulting increase or decrease in current input to the inductor, thereby causing the amplifier to generate an impulse of the same character as the impulse generated when using two inductors. This impulse is then transmitted to the servo amplifier, thence to the servo motor and then to the buck-boost potentiometer which effects compensation for roll deflection through control of the generator for the back-up roll drive.

Figure 10:
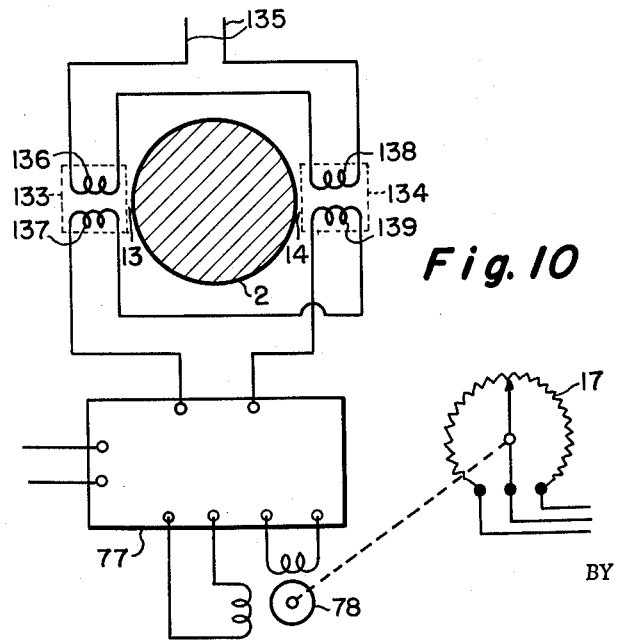
FIGURE 10 is a schematic view of a sixth embodiment of my invention.

FIGURE 10 shows a sixth embodiment of my invention which uses changes in strength of magnetic lines to detect and compensate for roll deflection. As shown, I locate two proximity transformers 133 and 134, one on each side of the small work roll 2 and connect the primary winding of each transformer to a source of A.C. power 135. Proximity transformer 133 has a primary winding 136 and a secondary winding 137 and proximity transformer 134 has a primary winding 138 and a secondary winding 139. Each transformer is spaced apart from the work roll 2 to form the small gaps 13 and 14 between the roll face and each transformer and each primary winding directs magnetic flux linkages to the roll 2 across the gaps and to its secondary winding. I have found that a gap between the roll face and the proximity transformer of about 0.005″ to about 0.025″ effects satisfactory detection of roll deflection. The two primary windings are connected series aiding and the two secondary windings are connected series bucking.

Connected to the two secondary windings 137 and 139 is the servo amplifier 77 and the servo motor 78. Thus, output voltage of the two secondary windings travels to the servo amplifier 77 which amplifies the voltage and transmits it to the servo motor 78. The servo motor 78 operates the buck-boost potentiometer rheostat 17 to effect compensation for roll deflection through control of the generator for the back-up roll drive.

Because the two secondary windings are connected series bucking, the two output voltages in the secondary circuit are opposite in phase and the net output of the two proximity transformers is the difference between the two output voltages.

When the small work roll 2 is in axial alignment with the backing rolls and when it has no lateral deflection, the gaps 13 and 14 are equal in length. Thus, for equal length air gaps, the voltage output of the two secondary windings is equal and since the two secondary windings are connected series bucking, there is no transformer output voltage. However, when the roll 2 deflects towards one transformer, there is an increase in the strength of the magnetic flux linkages from the transformer towards the roll accompanied by a distortion of the transformer's flux pattern caused by a change in proximity of the roll having ferromagnetic properties relative to the transformer. Accordingly, the increase in the strength of the magnetic flux linkages caused by deflection toward the transformer produces an increase in the voltage output of its secondary winding. Rolls made from steel and made from tungsten carbide have ferro-magnetic properties with the ferro-magnetic properties in tungsten carbide being in the cobalt binder. Correspondingly, there is a decrease in the strength of the magnetic flux linkages from the transformer away from which the roll deflects accompanied by a distortion of the transformer flux pattern caused by the change in proximity of the roll relative to the transformer. Thus, the decrease in the strength of the magnetic flux linkages caused by deflection away from the transformer produces a decrease in the voltage output of its secondary winding. Therefore, roll deflection effects a net output voltage of the two proximity transformers.

This net output voltage is proportional in amount to the magnitude of the deflection and is directional in accordance with the direction of deflection. The servo amplifier generates from this net output voltage an impulse which is proportional to the amount of deflection and which has characteristics of direction of deflection.

A single proximity transformer 140 positioned on one side of the small work roll 2, as shown in FIGURE 11, satisfactorily detects roll deflection. In using a single proximity transformer, its voltage output to the servo amplifier 77 when there is no work roll deflection and the work roll is in axial alignment with the backing rolls is matched with a standard voltage in the servo amplifier. When there is roll deflection toward or away from the proximity transformer, there is a resulting increase or decrease in the voltage output of the transformer, thereby causing the servo amplifier to generate an impulse of the same character as the impulse produced when using two proximity transformers. This impulse is amplified and then transmitted to the servo motor which in turn operates the buck-boost potentiometer rheostat 17 to effect compensation for roll deflection through control of the generator for the back-up roll drive.

Where deflection of the top work roll 3 must be individually and independently sensed from that of the bottom work roll 2 and where compensation for each work roll must be individually and independently effected, a duplicate of the embodiments of FIGURES 1 and 2, of FIGURE 6, of FIGURE 7, of FIGURE 8, of FIGURE 9, of FIGURE 10, and of FIGURE 11 can be easily added to the mill. Under such circumstances, the bottom work roll 2 and the top work roll 3 each have an independent and separate deflection sensing device as shown in the embodiments of FIGURES 1 and 2, of FIGURE 6, of FIGURE 7, of FIGURE 8, of FIGURE 9, of FIGURE 10, and of FIGURE 11, and a separate and independent impulse generator. In other words, the rolling mill wherein deflection of each work roll must be separately and independently sensed and compensated therefor has two independent and separate roll deflection detecting and compensating apparatuses.

Referring to FIGURE 3, I have shown an electrical wiring diagram for effecting compensation for roll deflection through control of the back-up roll drive. The wiring diagram of FIGURE 3 utilizes the impulse generated by my apparatus to compensate for roll deflection. As shown, the electric motor 6 drives the lower backing roll 4 and the electric motor 7 drives the upper backing roll 5. The drive for the winding reel comprises two motors 61 and 62 arranged in tandem with a clutch 104 therebetween and the drive for the feed reel also comprises two motors 105 and 106 with a clutch 107 therebetween. The clutch 104 is engaged so that both motors 61 and 62 drive the winding reel 8 while the other clutch 107 is open so that only the motor 106 next to the feed reel 10 functions as a drag generator and thereby exerts back tension on the strip. When the mill is reversed so that the feed reel becomes the winding reel and the winding reel becomes the feed reel, clutch 107 is closed and the clutch 104 is opened.

I use separate generators 18, 108 and 109 for the back-up roll drive, the winding reel drive and the feed reel drive, respectively. Generator 18 for the back-up roll drive, in addition to its main field winding 110, has the auxiliary field 59 connected to the buck-boost potentiometer rheostat 17. It is through control of this auxiliary field that, in the wiring diagram of FIGURE 3, I regulate output armature voltage of the generator and thereby control the back-up roll drive to compensate for roll deflection. An A.C. motor 111 drives the main generators 18, 108 and 109, as shown in FIGURE 3.

Conductor 112 connects the buck-boost potentiometer rheostat 17 to the auxiliary field 59 of the generator 18. Thus, the back-up roll drive generator 18 is under control of my apparatus. Accordingly, the impulse produced by one of the impulse generators 15, 69, 75, or 99 is transmitted to the electric controls for the mill. Depending upon direction of swing of the control arm of the buck-boost potentiometer rheostat, the auxiliary field 59 is excited through the potentiometer rheostat 17 and through a center tapped resistor 113, whereby it adds to or subtracts from the output armature voltage of the generator 18 set up by the main field 110. This adding to or subtracting from the output armature voltage raises or lowers the roll drive torque generated by the motors 6 and 7 and in this way, compensates for roll deflection by reestablishing the balance between roll drive torque, winding reel torque, and feed reel torque (where a feed reel is used).

Static or rotating amplifiers or regulators (not shown) can be substituted for the servo motor 78, the potentiometer 17 and the center tapped resistor 113, or can be used in combination with the servo motor and potentiometer bridge in my invention to achieve control of the operation of the mill.

Figure 4:
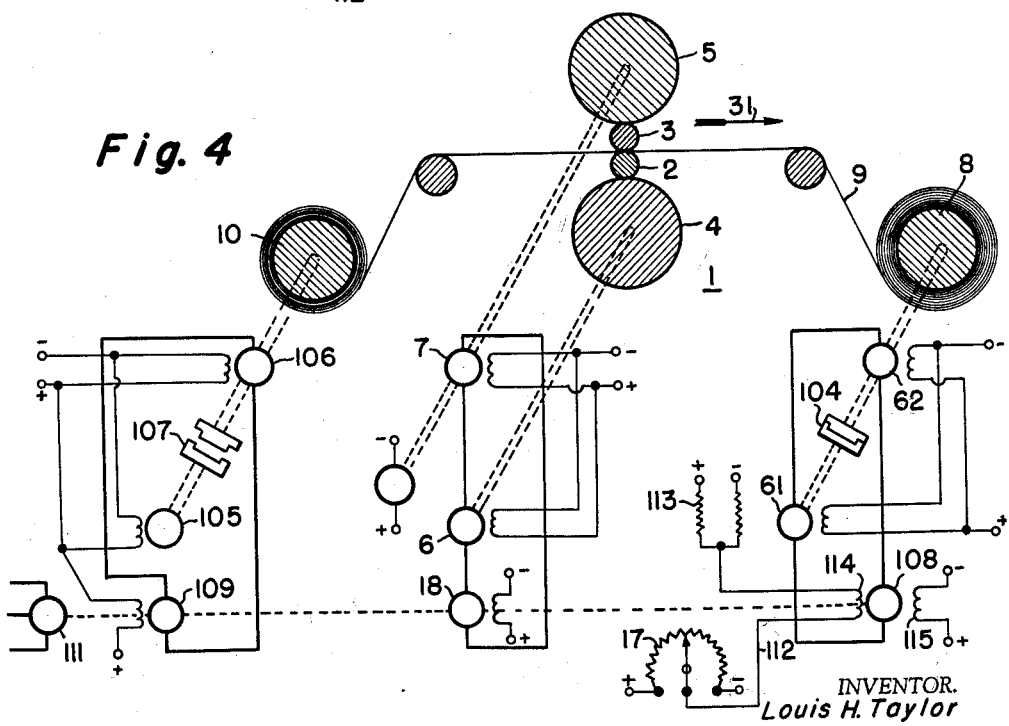
FIGURE 4 is a combination schematic and wiring diagram similar to FIGURE 3 but showing the apparatus of FIGURE 1 arranged to regulate the motors driving the winding reel to compensate for roll deflection.

As shown in FIGURE 4, control of the operation of the mill to compensate for roll deflection may also be effected by regulation of the winding reel drive. The generator 108 for the winding reel drive has an auxiliary field 114 connected to the buck-boost potentiometer rheostat 17. Depending upon the direction and magnitude of roll deflection, the buck-boost potentiometer rheostat 17 and the center tapped resistor 113 excite the auxiliary field 114 in a direction which adds to or subtracts from the output armature voltage generated by the main field 115 of the generator 108. Accordingly, torque developed by the winding reel drive is increased or decreased to bring about the balance of forces.

Figure 5:
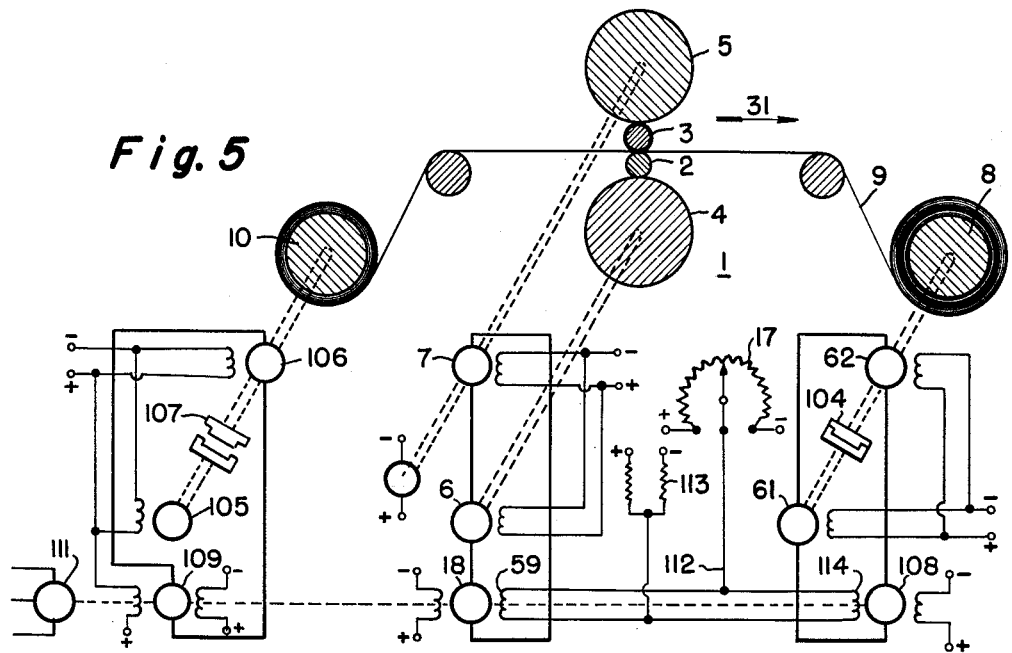
FIGURE 5 is a combination schematic and wiring diagram showing the apparatus of FIGURE 1 used to regulate both the motors driving the backing rolls and the motors driving the winding reel to compensate for roll deflection.

FIGURE 5 shows a combination control of the mill for compensation of roll deflection. As shown, both the generator 18 of the back-up roll drive and the generator 108 of the winding reel drive have auxiliary fields 59 and 114 respectively. These two auxiliary fields receive simultaneous excitation for each is connected to the buck-boost potentiometer rheostat 17. The two auxiliary fields 59 and 114 are connected in parallel so that one bucks its generator output armature voltage, while the other boosts its generator output armature voltage. Accordingly, where roll deflection occurs in the direction of strip travel, the torque developed by the back-up roll drive is increased and simultaneously the torque generated by the winding reel drive is decreased. In this way, compensation for roll deflection is effected quicker than where either the back-up roll drive or the winding reel drive is used individually.

With large generators having substantial field current demands which are beyond the capacity and capability of buck-boost potentiometer rheostats, I substitute a regulating exciter for the buck-boost potentiometer. Except for the substitution of the regulating exciter, the control for the mill is the same as that previously described.

Figure 13:
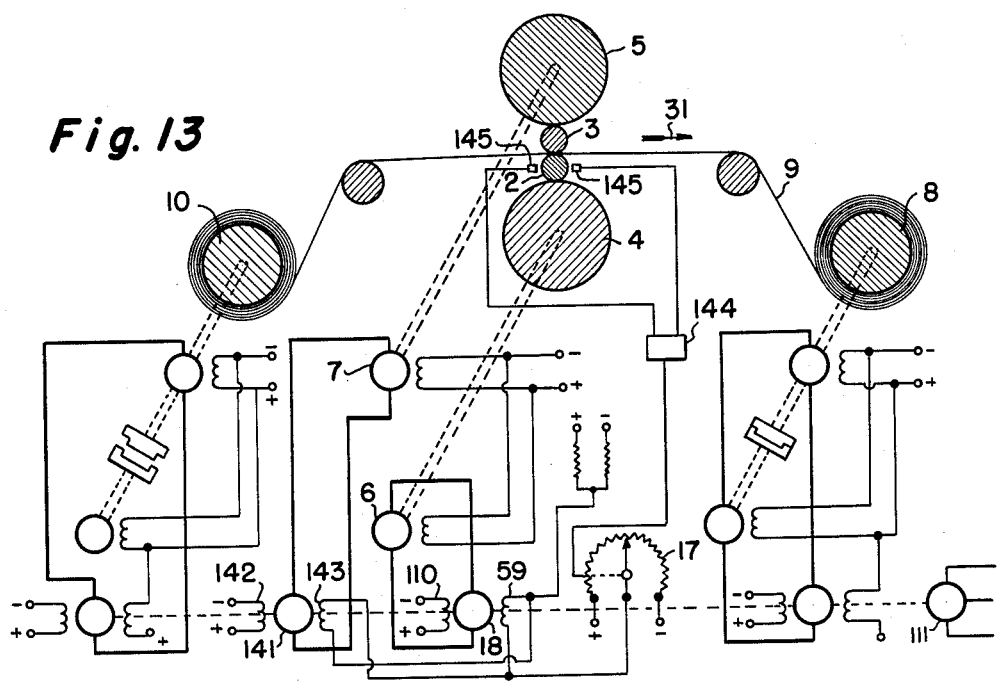
FIGURE 13 is a combination schematic and wiring diagram showing how my apparatus detects deflection of one work roll and compensates for deflection of both work rolls by increasing the amount of torque delivered to one work roll and decreasing the amount of torque delivered to the other work roll.

FIGURE 13 shows a control of the mill for compensation of roll deflection where one work roll deflects in one direction and the other work roll deflects in the opposite direction and where deflection of one of the two work rolls is sensed. As shown, the motor 6 which drives the bottom backing roll 4 is controlled by its generator 18 and the motor 7 which drives the top backing roll 5 is controlled by a second generator 141 which is electrically separate and independent of the generator 18. Generator 18 has a main field 110 and an auxiliary field 59 and generator 141 has a main field 142 and an auxiliary field 143. The two auxiliary fields 59 and 143 receive simultaneous excitation through connection to the buck-boost potentiometer rheostat 17 which is connected to an impulse generator 144 similar to the impulse generators previously described herein. A deflection sensing device 145 detects deflection of the lower work roll 2 and is connected to the impulse generator 144. The two auxiliary fields 59 and 143 are connected in parallel so that one bucks its generator output armature voltage while the other boosts its generator output armature voltage. Accordingly, where the bottom work roll 2 deflects in the direction of strip travel and where the top work roll 3 deflects in the opposite direction, the torque developed by the drive for the bottom back-up roll is increased and simultaneously, the torque generated by the drive for the top back-up roll is decreased. In this way, compensation for deflection of each roll is effected quickly and efficiently.

Figure 14:
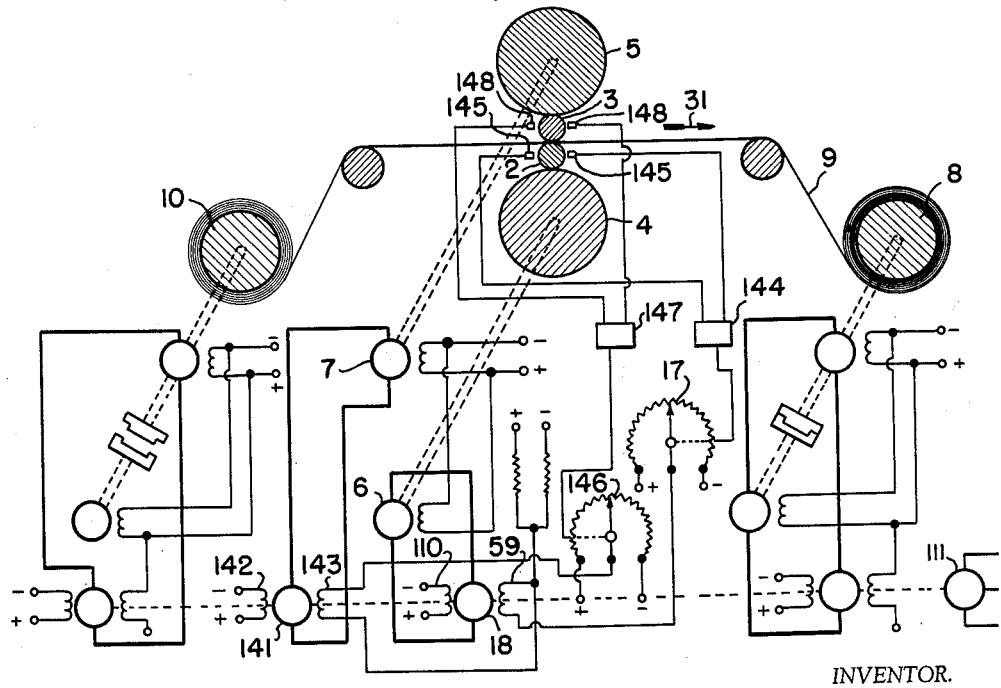
FIGURE 14 is a combination schematic and wiring diagram showing my apparatus arranged to independently sense deflection of each work roll and to independently compensate therefor by independent control of the motor which drives each backing roll.

FIGURE 14 shows a control of the mill for compensation of roll deflection where deflection of each work roll 2 and 3 is individually and independently sensed and where the amount of torque delivered to each backing roll therefor is individually and independently controlled. As shown, the motor 6 which drives the bottom backing roll 4 is controlled by the generator 18 and the motor 7 which drives the top backing roll is controlled by the generator 141 connected thereto. The two generators are electrically separate and independent whereby each motor 6 and 7 is separately and independently controlled. Generator 18 has a main field 110 and an auxiliary field 59 and generator 141 has a main field 142 and an auxiliary field 143. The auxiliary field 59 of generator 18 receives excitation from the potentiometer rheostat 17 connected to the impulse generator 144 which, in turn, is connected to the deflection sensing device 145 disposed to detect deflection of the lower work roll 2. The auxiliary field 143 of generator 141 receives excitation from a second potentiometer rheostat 146 which is connected to a second impulse generator 147. A second deflection sensing device 148 detects deflection of the top work roll 3 and is joined to the impulse generator 147. The deflection sensing device 148, the impulse generator 147 and the potentiometer rheostat 146 are separate and independent from the deflection sensing device 145, the impulse generator 144 and the potentiometer rheostat 17. Accordingly, sensing deflection of the top work roll 3 and compensation therefor is effected separate and independent from sensing deflection of the lower work roll 2 and compensation therefor.

Figure 15:
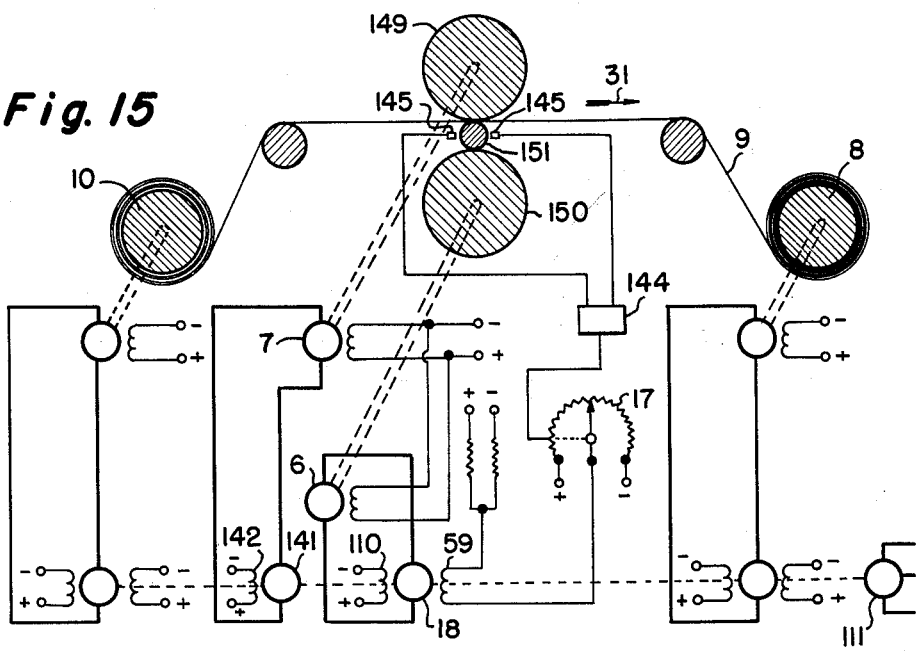
FIGURE 15 is a combination schematic and wiring diagram showing my apparatus applied to a 3-high mill.

FIGURE 15 shows my apparatus applied to a 3-high mill having a driven top roll 149, a driven bottom roll 150, and a small intermediate roll 151 disposed between the top and bottom rolls. The winding reel 8 coils up the strip 9 which travels through the mill in the direction of the arrow 31 and the unwinding reel 10 feeds the strip to the mill. As shown, the motor 6, which drives the bottom roll 150, is controlled by the generator 18 and the motor 7 which drives the top roll, is controlled by the generator 141 connected thereto. The generator 18 has a main field 110 and an auxiliary field 59, and the generator 141 has a main field 142.

My apparatus senses deflection of the small intermediate roll 151 and effects compensation therefor. The deflection sensing device 145 is disposed relative to the intermediate roll 151 as previously described with respect to the embodiments of my invention, and detects deflection of the intermediate roll. The deflection sensing device is connected to the impulse generator 144 which delivers an impulse to the potentiometer rheostat 17. The auxiliary field 59 receives excitation from the potentiometer 17 and bucks or boosts the output armature voltage of the generator 18 depending upon the nature of the impulse produced by the impulse generator 144 in response to deflection of the intermediate roll 151.

Motor 7 need not have its own generator for both motors 6 and 7 may be connected to a single generator in which case, the potentiometer rheostat 17 is connected to a conventional booster unit (not shown) for the motor 6. The booster unit functions in the same manner as the auxiliary field 59 and brings about an increase or decrease in the amount of torque delivered to the bottom roll 150 to compensate for deflection of the intermediate roll 151. Thus, compensation for deflection of the intermediate roll 151 may be brought about by control of the amount of torque delivered to either the top or the bottom driven rolls of a 3-high mill.

Compensation for deflection of the intermediate roll 151 may also be effected by using the control for the motors 6 and 7 shown in FIGURE 13, namely, by supplying the generator for the motor 7 with an auxiliary field and connecting the two auxiliary fields for the two generators of the motors 6 and 7 in parallel whereby one bucks its generator output armature voltage while the other boosts its generator armature voltage.

Figure 16:
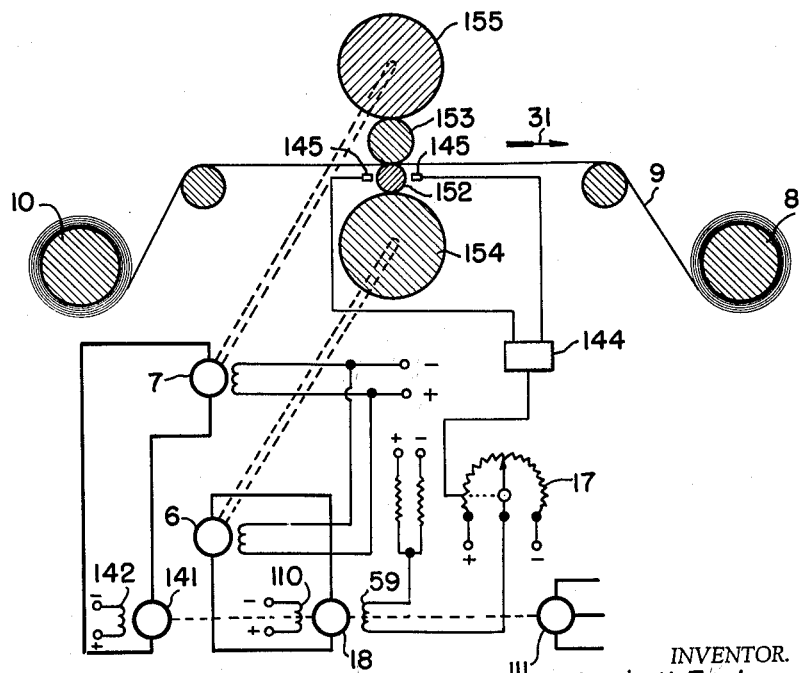
FIGURE 16 is a schematic diagram showing my apparatus applied to a 4-high mill having one work roll smaller than the other work roll.

FIGURE 16 shows my apparatus applied to a 4-high mill having a small work roll 152 and a large work roll 153. As shown, each backing roll 154 and 155 is driven; however, an alternate drive comprises driving the bottom backing roll 154 and the large work roll 153. On such a 4-high mill, my apparatus senses deflection of the small work roll 152. The deflection sensing device 145 which detects deflection of the small work roll 152 is connected to the impulse generator 144. This impulse generator delivers an impulse to the potentiometer rheostat 17 which is connected to the drive for the driven rolls. Accordingly, compensation for deflection of the small work roll is accomplished in the same manner as described herein with respect to the 3-high mill, namely, by increasing and/or decreasing the amount of torque delivered to one or both of the driven rolls.

Figure 17:
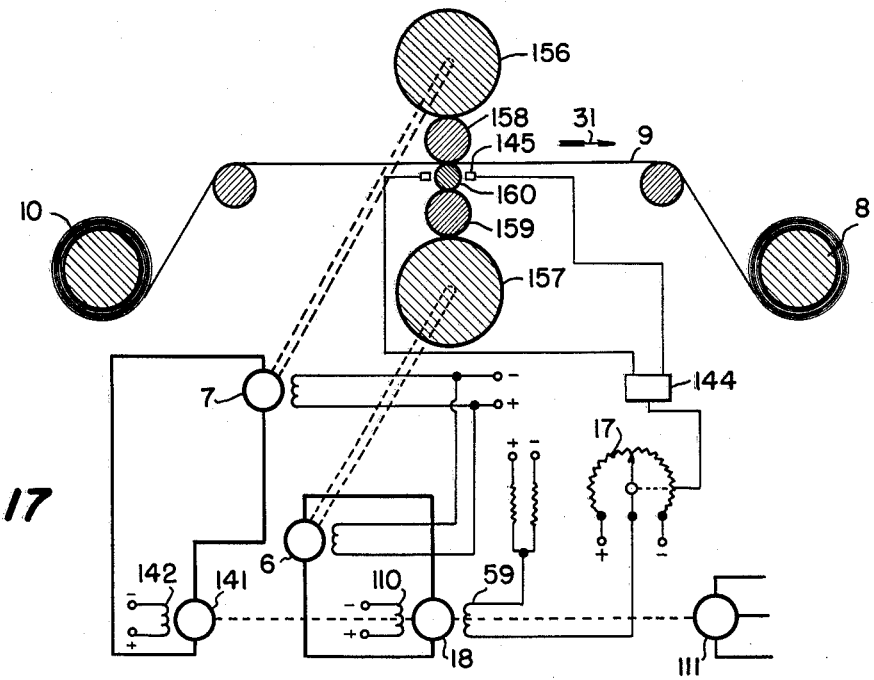
FIGURE 17 is a schematic diagram showing my apparatus applied to a 5-high mill.

FIGURE 17 shows my apparatus applide to a 5-high mill which has a driven top backing roll 156 and a driven bottom backing roll 157. Disposed between the top and bottom backing rolls are a top intermediate roll 158 which functions as a large work roll and a bottom intermediate roll 159 which may also function as a large work roll. Located between the two intermediate rolls is a small work roll 160. The strip 9 may travel either between the top intermediate roll 158 and the small work roll or between the bottom intermediate roll 159 and the small work roll.

Alternate drives for this mill comprise driving the two intermediate rolls or driving the top backing roll and the bottom intermediate roll, or where the bottom intermediate roll is a large work roll instead of the top intermediate roll, driving the bottom backing roll and the top intermediate roll.

In this 5-high mill, my apparatus senses deflection of the small work roll 160. The deflection sensing device 145 which detects deflection of the small work roll is connected to the impulse generator 144. This impulse generator delivers an impulse to the potentiometer rheostat 17 which is connected to the drive for the driven rolls. Accordingly, compensation for deflection of the small work roll is brought about in the same manner as described herein with respect to the 3-high mill, namely, by increasing and/or decreasing the amount of torque delivered to one or both of the driven rolls.

Figure 18:
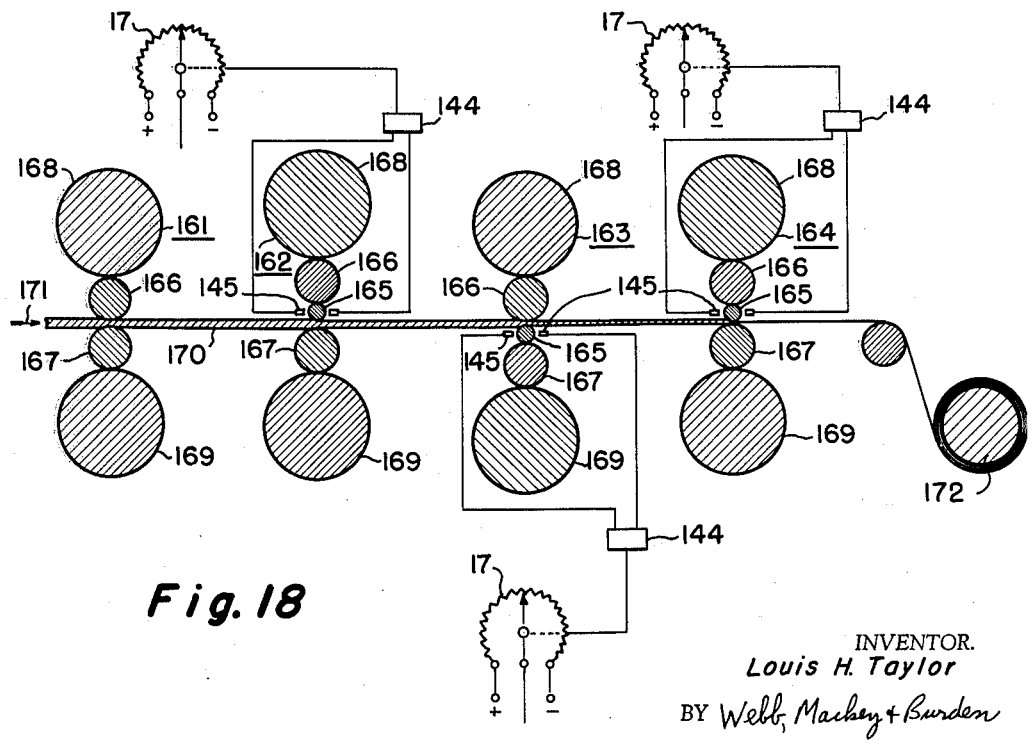
FIGURE 18 is a schematic diagram showing my apparatus applied to a tandem mill.

FIGURE 18 shows my apparatus applied to a 4-high tandem mill which has four stands, 161, 162, 163 and 164, each having a pair of backing rolls 168 and 169 and a pair of driven intermediate rolls 166 and 167. As shown, the intermediate rolls for stand 161 comprise the work rolls and one of the intermediate rolls for stands 162, 163 and 164 comprises a large working roll. Disposed between the intermediate rolls 166 and 167 of each of stands 162, 163 and 164 is a small work roll 165. The strip 170 rolled on the mill travels in the direvtion of arrow 171 and is coiled on a winding reel 172.

Of course, my apparatus is equally applicable to a 2-stand, 3-stand, 5-stand, etc. tandem mill.

On the tandem mill of FIGURE 18, my apparatus senses deflection of the small work roll 165 on each of stands 162, 163 and 164. Specifically, each of stands 162, 163 and 164 has the deflection sensing device 145 which detects deflection of the small work roll 165. Connected to the deflection sensing device 145 is the impulse generator 144 which functions in the same manner as previously described and delivers an impulse to the potentiometer rheostat 17 adapted to control the drive for the intermediate rolls. The connection of the potentiometer rheostat 17 to the drive for the intermediate rolls and the drive for the intermediate rolls itself is the same as that shown in FIGURE 15 for the 3-high mill. Accordingly, compensation for deflection of the small work roll 165 is brought about in the same manner as that described in regard to the 3-high mill, namely, by increasing and/or decreasing the amount of torque delivered to one or both of the driven rolls.

As shown in FIGURE 18, the small work roll is disposed on the same side of the strip 170 for stands 162 and 164 and on the opposite side of the strip for stand 163. If desired, a mill operator may arrange the small roll of each of the three stands on either side of the strip and may locate the small work roll for the three stands on the same side of the strip, namely, so that it comprises the top work roll for stands 162, 163 and 164.

My invention has important advantages which render it a highly desirable tool for rolling mills and particularly driven back-up roll mills. In the first place, the flood cooling systems employed on rolling mills do not affect functioning of my apparatus, and thereby permit use of my apparatus without in any way limiting full use of the flood cooling systems.

In the second place, my apparatus is highly sensitive and fast acting, thus permitting use of tungsten carbide work rolls which have significant advantages over steel rolls, as previously pointed out.

The high sensitivity of my apparatus produces a floating control over roll deflection of the work rolls. In other words, it effects adjustments in operation of the rolling mill which are only sufficient to balance or apportion power delivered to the mill to return the work rolls to substantially zero deflection or to a desired deflection. In some embodiments of my invention, there is generated no excess adjustment in operation of the mill which requires a position feed-back to bring about zero deflection. Accordingly, these embodiments have a no-droop control and since they produce only that amount of adjustment required to bring about zero deflection, they do not oscillate. Therefore, when a further or a new deflection occurs, there is a new adjustment in mill operation to compensate therefor.

My apparatus makes it possible to virtually float the work roll or rolls laterally within inherent bearing and chock clearances which may total 0.005" in some mills for I control deflection within 0.002" total, i.e., plus 0.001" and minus 0.001". The magnitude of the chock clearances and the controlled deflection may vary depending upon the diameters of the work rolls used and the width of the mill.

In the third place, my apparatus detects roll deflection caused by either or both the unbalance of forces and the combination of force generated by the screw-down mechanism and of the bearing tolerances; it effects compensation in mill operation for the deflection and returns the rolls to axial alignment or to a given predetermined amount of deflection.

My invention may be utilized to advantage even in a mill having automatic controls thereon which permit the mill to operate automatically in the rolling of one or more coils after a pre-set rolling schedule has been established and recorded on a control tape or the like. My invention can be used on the rolling operation in which the control tape is being prepared and, if desired, it may be used in subsequent rollings even though the control tape has recorded thereon and will function to make any changes required in the functioning of the mill on subsequent operations. It may not be necessary to use my invention on such tape controlled operations but, if used, it provides assurance against objectionable roll deflection.

While I have described certain preferred embodiments of my invention, it is to be understood that it may be otherwise embodied within the scope of the following claims.

I claim:

1. Apparatus for detecting and correcting deflection of a roll of a mill for rolling metals, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising means for directing and impinging a medium of a given strength upon a face of said roll, said directing and impinging means being spaced from said roll face a distance sufficient to form a relatively small gap therebeween across which said medium travels from said directing and impinging means to said roll face, the position of the directing and impinging means relative to the roll face being such that deflection of the roll is toward and away from the directing and impinging means and shortens and lengthens said gap and being such that deflection of said roll produces a change in the strength of said medium, means connected to said directing and impinging means for detecting shortening and lengthening of said gap by sensing the change in the strength of the medium, means connected to said sensing means for generating from said change in strength an impulse which has a magnitude proportional to the amount of deflection of said roll, means connected to said impulse generating means for transmitting said impulse to at least one of a plurality of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

2. A method of detecting and correcting for deflection of a roll of a mill for rolling metals, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising directing and impinging a medium of a given strength from a station spaced from the roll onto a face of said roll across a gap between said face and said station, said roll face and said roll being subject to deflection toward and away from said station, thereby shortening and lengthening the gap, said deflection producing a change in the strength of the medium, sensing said shortening and lengthening of said gap by detecting the change in strength of the medium, generating from said change in said strength an impulse which has a magnitude proportional to the amount of deflection of said roll, and transmitting said impulse to at least one of motors which impart driving force to said roll through tension applied to said metal by at least one of winding and unwinding reels and through torque applied to at least one backing roll for said roll, providing from said impulse a buck-boost output armature voltage for at least one of said motors to control operation thereof for maintaining said gap at a substantially constant length.

3. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising means for directing and impinging a fluid under pressure upon a face of said roll, said directing and impinging means being spaced from said roll face a distance sufficient to form a relatively small gap therebetween across which said fluid under pressure travels from said directing and impinging means to said roll face, the position of the directing and impinging means relative to the roll face being such that deflection of the roll is toward and away from the directing and impinging means and shortens and lengthens said gap and being such that deflection of said roll produces a change in the pressure of said fluid under pressure, means connected to said directing and impinging means for detecting shortening and lengthening of said gap by sensing the change in pressure of the fluid under pressure, means connected to said sensing means for generating from said change in pressure an impulse which has a magnitude proportional to the amount of deflection of said roll, means connected to said impulse generating means for transmitting said impulse to at least one of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

4. The apparatus of claim 3 characterized by said detecting means being a transducer having a diaphragm operative upon a change in said fluid under pressure, and by said impulse generating means including a jet pipe fluid pressure amplifier and a fluid pressure motor, and by said transmitting means including linkage and a buck-boost potentiometer, said diaphragm being operatively connected to said jet pipe fluid-pressure amplifier which is connected to said buck-boost potentiometer through said fluid pressure motor and said linkage, said buck-boost potentiometer being in circuit with said motor for regulation of its operation.

5. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising two means for directing and impinging a fluid under pressure upon a face of said roll, said two means being disposed on opposite sides of said roll face and each being spaced from said roll face a distance sufficient to form a relatively small gap therebetween across which said fluid under pressure travels from each of said two means to the roll face, the position of the two means relative to the roll face being such that deflection of the roll is towards one of the two means and away from the other and shortens one of said gaps and lengthens the other gap and being such that deflection of the roll produces a change in pressure of the fluid under pressure delivered by each of said two means, means connected to said two means for detecting shortening and lengthening of said gaps by sensing a change in said pressure of said fluid under pressure, means connected to said sensing means for generating from said change in pressure an impulse which has a magnitude proportional to the amount of deflection of said roll, and means connected to said impulse generating means for transmitting said impulse to at least one of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

6. The apparatus of claim 5 characterized by said detecting means being a transducer having a diaphragm operative upon a change in said fluid under pressure, and by said impulse generating means including a jet pipe fluid pressure amplifier and a fluid pressure motor, and by said transmitting means including linkage and a buck-boost potentiometer, said diaphragm being operatively connected to said jet pipe fluid pressure amplifier which is connected to said buck-boost potentiometer through said fluid pressure motor and said linkage, said buck-boost potentiometer being in circuit with said motor for regulation of its operation.

7. A method of detecting and correcting for deflection of a roll of a mill for rolling metals, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising directing and impinging a medium of a given strength from two stations spaced from the roll onto a face of said roll, said two stations being on opposite sides of said roll face, said direction of the medium being across a gap between said face and each of said two stations, said roll face and said roll being subject to deflection toward one station and away from the other station, thereby shortening one gap and lengthening the other gap, said roll deflection producing a change in the strength of the medium, sensing said shortening and lengthening of said two gaps by detecting the change in strength of the medium, generating from said change in strength of the medium an impulse which has a magnitude proportional to the amount of deflection of said roll, and transmitting said impulse to at least one of motors which impart driving force to said roll through tension applied to said metal by at least one of winding and unwinding reels and through torque applied to at least one backing roll for said roll, providing from said impulse a buck-boost output armature voltage for at least one of said motors to control operation thereof for maintaining said gap at a substantially constant length.

8. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising means for directing and impinging a fluid under pressure upon a face of said roll, said directing and impinging means being spaced from said roll face a distance sufficient to form a relatively small gap therebetween across which said fluid under pressure travels from said directing and impinging means to said roll face, the position of the directing and impinging means relative to the roll face being such that deflection of the roll is toward and away from the directing and impinging means and shortens and lengthens said gap and being such that deflection of said roll produces a change in the pressure of said fluid under pressure, a transducer having a diaphragm operative upon a change in said fluid under pressure connected to said directing and impinging means for detecting shortening and lengthening of said gap by movement of said diaphragm in response to the change in pressure of the fluid under pressure, said diaphragm being operatively connected to a linear variable differential transformer for generating an impulse from movement of said diaphragm, an amplifier connected to said linear variable differential transformer and connected to a buck-boost potentiometer in circuit with at least one of motors which imparts driving force to said roll through tension applied to said metal by at least one of winding and unwinding reels and through torque applied to at least one backing roll for said roll, said buck-boost potentiometer being adapted to control operation of at least one of said motors to maintain said gap at a substantially constant length.

9. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising two means for directing and impinging a fluid under pressure upon a face of said roll, said two means being disposed on opposite sides of said roll face and each being spaced from said roll face a distance sufficient to form a relatively small gap therebetween across which said fluid under pressure travels from each of said two means to the roll face, the position of the two means relative to the roll face being such that deflection of the roll is towards one of the two means and away from the other and shortens one of said gaps and lengthens the other gap and being such that deflection of the roll produces a change in pressure of the fluid under pressure delivered by each of said two means, a transducer having a diaphragm operative upon a change in said fluid under pressure connected to said two directing and impinging means for detecting shortening and lengthening of said gap by movement of said diaphragm in response to the change in pressure of the fluid under pressure, said diaphragm being operatively connected to a linear variable differential transformer for generating an impulse from movement of said diaphragm, an amplifier connected to said linear variable differential transformer and connected to a buck-boost potentiometer in circuit with at least one of motors which imparts driving force to said roll through tension applied to said metal by at least one of winding and unwinding reels and through torque applied to at least one backing roll for said roll, said buck-boost potentiometer being adapted to control operation of at least one of said motors to maintain said gap at a substantially constant length.

10. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising an inductor for directing and impinging magnetic flux linkages of a given strength upon a face of said roll, said inductor being spaced from said roll face a distance sufficient to form a relatively small gap therebetween across which said magnetic flux linkages travel from said inductor to said roll face, the position of the inductor relative to the roll face being such that deflection of the roll is toward and away from the inductor and shortens and lengthens said gap and being such that deflection of said roll produces a change in the strength of said magnetic flux linkages impinged upon the roll face, means connected to said inductor for utilizing said change in said strength of the magnetic flux linkages to detect shortening and lengthening of said gap and including means for generating an impulse which has a magnitude proportional to the amount of deflection of said roll, means connected to said impulse generating means for transmitting said impulse to at least one of a plurality of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

11. The apparatus of claim 10 characterized by said utilizing means being an amplifier connected to said inductor.

12. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising two inductors for directing and impinging magnetic flux linkages of a given strength upon a face of said roll, said two inductors being disposed on opposite sides of said roll face and each being spaced from said roll face a distance sufficient to form a relatively small gap therebetween across which said magnetic flux linkages travel from each of said two inductors to the roll face, the position of the two inductors relative to the roll face being such that deflection of the roll is toward one inductor and away from the other inductor and shortens one gap and lengthens the other gap and being such that deflection of the roll produces a change in the strength of said magnetic flux linkages impinged upon the roll face, means connected to said inductors for utilizing said change in strength of the magnetic flux linkages to detect shortening and lengthening of said gaps and including means for generating an impulse which has a magnitude proportional to the amount of deflection of said roll, means connected to said impulse generating means for transmitting said impulse to at least one of a plurality of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

13. The apparatus of claim 12 characterized by said utilizing means being an amplifier connected to said inductors.

14. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising a proximity transformer for directing and impinging magnetic flux linkages of a given strength upon a face of said roll, said proximity transformer being spaced from said roll face a distance sufficient to form a relatively small gap therebetween across which said magnetic flux linkages travel from said proximity transformer to said roll face, the position of the proximity transformer relative to the roll face being such that deflection of the roll is toward and away from the proximity transformer and shortens and lengthens said gap and being such that deflection of said roll produces a change in the strength of said magnetic flux linkages impinged upon the roll face, means connected to said proximity transformer for utilizing said change in strength of the magnetic flux linkages to detect shortening and lengthening of said gap and including means for generating an impulse which has a magnitude proportional to the amount of deflection of said roll, means connected to said impulse generating means for transmitting said impulse to at least one of a plurality of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

15. The apparatus of claim 14 characterized by said utilizing means being an amplifier connected to said proximity transformer.

16. Apparatus for detecting and correcting deflection of a roll of a mill for rolling metal, said deflection of the roll being in a direction with and opposite to the direction of travel of metal through said mill, said roll engaging metal rolled on said mill and being driven by tension applied to said metal by at least one of winding and unwinding reels and by at least one backing roll in frictional engagement therewith, comprising two proximity transformers for directing and impinging magnetic flux linkages of a given strength upon a face of said roll, said two proximity transformers being disposed on opposite sides of said roll face and each being spaced from said roll face a distance sufficient to form a relatively small gap therebetween across which said magnetic flux linkages travel from each of said two proximity transformers to the roll face, the position of the two proximity transformers relative to the roll face being such that deflection of the roll is toward one proximity transformer and away from the other proximity transformer and shortens one gap and lengthens the other gap and being such that deflection of the roll produces a change in the strength of said magnetic flux linkages impinged upon the roll face, means connected to said proximity transformers for utilizing said change in strength of the magnetic flux linkages to detect shortening and lengthening of said gaps and including means for generating an impulse which has a magnitude proportional to the amount of deflection of said roll, means connected to said impulse generating means for transmitting said impulse to at least one of a plurality of motors which impart driving force to said roll through tension applied to said metal by at least one of winding and unwinding reels and through torque applied to at least one backing roll for said roll, said transmitting means including means for providing from said impulse a buck-boost output armature voltage for at least one of said motors to control operation thereof for maintaining said gap at a substantially constant length.

17. The apparatus of claim 16 characterized by said utilizing means being an amplifier connected to said proximity transformers.

References Cited in the file of this patent
UNITED STATES PATENTS

| | | |
|---|---|---|
| 2,025,562 | Balsiger | Dec. 24, 1935 |
| 2,065,702 | Hubbard | Dec. 29, 1936 |
| 2,182,659 | Cook | Dec. 5, 1939 |
| 2,601,792 | Dahlstrom | July 1, 1952 |

UNITED STATES PATENT OFFICE
CERTIFICATE OF CORRECTION

Patent No. 3,077,800                                February 19, 1963

Louis H. Taylor

It is hereby certified that error appears in the above numbered patent requiring correction and that the said Letters Patent should read as corrected below.

Column 4, line 70, for "body is" read -- body which is --; column 5, line 57, for "decerase" read -- decrease --; line 65, for "presure" read -- pressure --; column 13, line 24, for "includes" read -- induces --; column 20, line 66, for "applide" read -- applied --; column 21, line 27, for "direvtion" read -- direction --.

Signed and sealed this 10th day of September 1963.

(SEAL)
Attest:

ERNEST W. SWIDER                                      DAVID L. LADD
Attesting Officer                                            Commissioner of Patents